United States Patent
Morikuni et al.

(10) Patent No.: US 12,547,062 B2
(45) Date of Patent: Feb. 10, 2026

(54) OPTICAL SYSTEM AND PROJECTOR

(71) Applicant: SEIKO EPSON CORPORATION, Tokyo (JP)

(72) Inventors: Eiji Morikuni, Matsumoto (JP); Yuta Tokuno, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 567 days.

(21) Appl. No.: 18/076,474

(22) Filed: Dec. 7, 2022

(65) Prior Publication Data

US 2023/0176464 A1    Jun. 8, 2023

(30) Foreign Application Priority Data

Dec. 8, 2021 (JP) .................. 2021-199082

(51) Int. Cl.
| | |
|---|---|
| *G03B 21/28* | (2006.01) |
| *G02B 13/16* | (2006.01) |
| *G02B 17/08* | (2006.01) |
| *G03B 21/14* | (2006.01) |

(52) U.S. Cl.
CPC ............ *G03B 21/28* (2013.01); *G02B 13/16* (2013.01); *G02B 17/0856* (2013.01); *G03B 21/147* (2013.01)

(58) Field of Classification Search
CPC ........ G03B 21/14; G03B 21/16; G03B 21/28; G03B 21/147; G03B 21/2053; G03B 21/2066; G02B 13/00; G02B 13/16; G02B 17/004; G02B 17/086; G02B 17/0848; G02B 17/0856
See application file for complete search history.

(56) References Cited

U.S. PATENT DOCUMENTS

| | | | |
|---|---|---|---|
| 9,372,388 B2* | 6/2016 | Matsuo | H04N 9/315 |
| 2002/0018289 A1 | 2/2002 | Nanba et al. | |
| 2003/0128342 A1 | 7/2003 | Wada et al. | |
| 2011/0164311 A1 | 7/2011 | Morikuni | |
| 2013/0070217 A1 | 3/2013 | Tatsuno | |
| 2015/0015851 A1* | 1/2015 | Yamada | G02B 7/1815 |
| | | | 353/61 |
| 2015/0205099 A1* | 7/2015 | Arai | G02B 13/18 |
| | | | 359/708 |

(Continued)

FOREIGN PATENT DOCUMENTS

| | | |
|---|---|---|
| CN | 1398361 A | 2/2003 |
| CN | 110632747 A | 12/2019 |

(Continued)

*Primary Examiner* — Sultan Chowdhury
(74) *Attorney, Agent, or Firm* — Oliff PLC

(57) ABSTRACT

An optical system includes a first optical element, and a second optical element arranged at a reduction side of the first optical element. The first optical element has a first reflecting surface having a concave shape. The second optical element has a first transmission surface, a second reflecting surface arranged at the reduction side of the first transmission surface, and a second transmission surface arranged at the reduction side of the second reflecting surface. A first optical axis of the first reflecting surface is parallel to a second optical axis of the first transmission surface. At least one of the first transmission surface, the second reflecting surface, and the second transmission surface has power.

12 Claims, 19 Drawing Sheets

(56) References Cited

U.S. PATENT DOCUMENTS

| | | |
|---|---|---|
| 2017/0332057 A1 | 11/2017 | Matsuo |
| 2018/0332257 A1 | 11/2018 | Matsuo |
| 2019/0011684 A1 | 1/2019 | Ishihara et al. |
| 2019/0313064 A1 | 10/2019 | Matsuo |
| 2020/0033574 A1* | 1/2020 | Morikuni ............. G02B 17/086 |
| 2020/0033715 A1 | 1/2020 | Morikuni |
| 2020/0142291 A1* | 5/2020 | Nishikawa ............. G03B 21/28 |

FOREIGN PATENT DOCUMENTS

| | | |
|---|---|---|
| CN | 110780434 A | 2/2020 |
| JP | H09-258106 A | 10/1997 |
| JP | 2010-020064 A | 1/2010 |
| JP | 2011-138086 A | 7/2011 |
| JP | 2013-64816 A | 4/2013 |
| JP | 2017-156714 A | 9/2017 |

\* cited by examiner

OPTICAL SYSTEM AND PROJECTOR

The present application is based on, and claims priority from JP Application Serial Number 2021-199082, filed Dec. 8, 2021, the disclosure of which is hereby incorporated by reference herein in its entirety.

BACKGROUND

1. Technical Field

The present disclosure relates to an optical system and a projector.

2. Related Art

A projection optical system having a projection lens, a first mirror, and a second mirror in this order from a reduction side toward an enlargement side is described in JP-A-2013-064816 (Document 1). The first mirror has a planar shape, and the second mirror has a concave shape. When using the projection optical system for a projector, an image display element is installed on a reduction-side imaging plane of the projection optical system. On an enlargement-side imaging plane of the projection optical system, there is installed a screen. In Document 1, projection light which is transmitted through the projection lens from the image display element side and then enters the first mirror is a diffused light beam, and the projection light which has been reflected by the first mirror and then reflected by the second mirror is once converged, and then reaches the screen disposed on the enlargement-side imaging plane.

In the projection optical system in Document 1, in order to prevent the first mirror located at the enlargement side of the projection lens from physically interfering with both of the projection lens and the second mirror, it is necessary to ensure a large air gap between the first mirror and the second mirror. Therefore, since it is difficult to make the first mirror and the second mirror close to each other, the projection optical system grows in size.

SUMMARY

In view of the problems described above, an optical system according to the present disclosure includes a first optical element, and a second optical element arranged at a reduction side of the first optical element. The first optical element has a first reflecting surface having a concave shape. The second optical element has a first transmission surface, a second reflecting surface arranged at the reduction side of the first transmission surface, and a second transmission surface arranged at the reduction side of the second reflecting surface. A first optical axis of the first reflecting surface is parallel to a second optical axis of the first transmission surface. At least one of the first transmission surface, the second reflecting surface, and the second transmission surface has power.

Then, a projector according to the present disclosure includes a light modulator arranged on a reduction-side conjugated plane and configured to modulate light emitted from a light source, and the optical device described above which is configured to project the light modulated by the light modulator.

DESCRIPTION OF EXEMPLARY EMBODIMENTS

An optical system and a projector according to some embodiments of the present disclosure will hereinafter be described with reference to the drawings.

Projector

Figure 1:
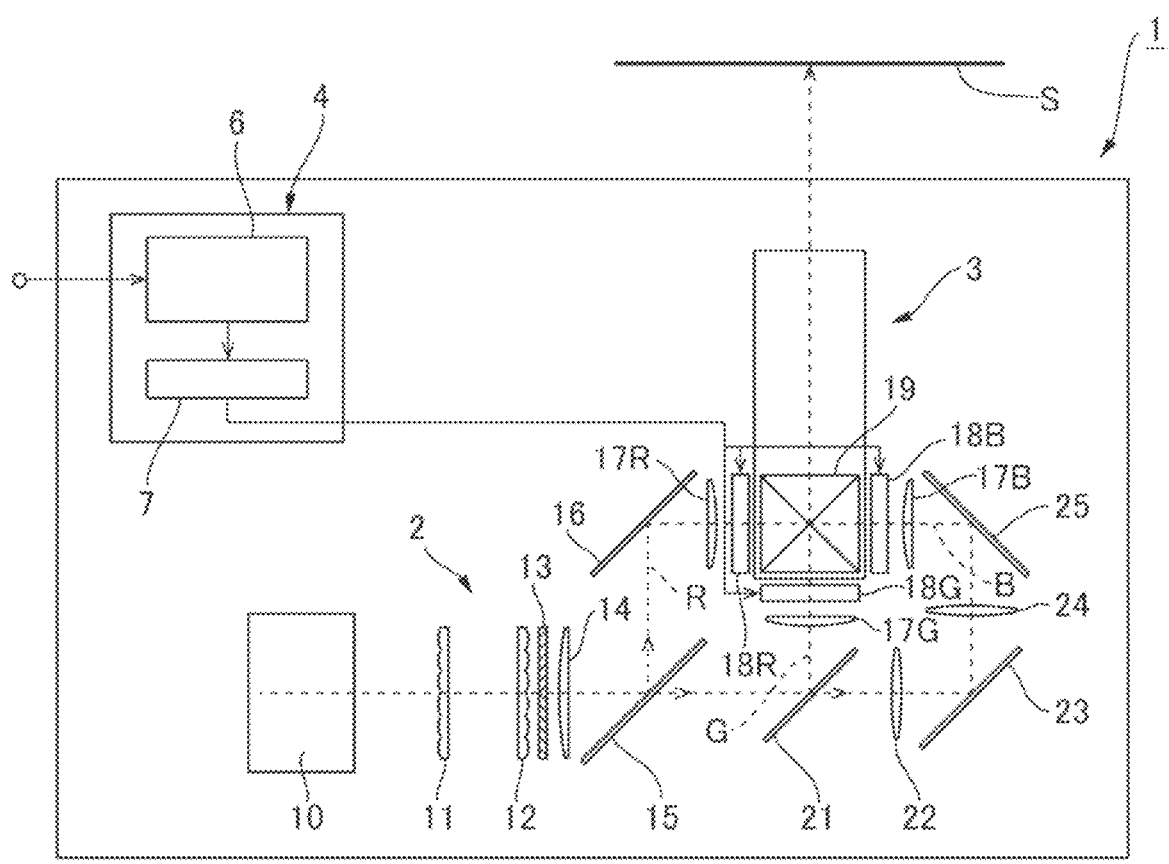
FIG. 1 is a diagram showing a schematic configuration of a projector equipped with an optical system according to the present disclosure.

FIG. 1 is a diagram showing a schematic configuration of a projector equipped with an optical system 3 according to the present disclosure. As shown in FIG. 1, the projector 1 is provided with an image formation section 2 for generating a projection image to be projected on a screen S, the optical system 3 for enlarging the projection image to project an enlarged image on the screen S, and a control section 4 for controlling an operation of the image formation section 2.

Image Formation Section and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light having entered the first dichroic mirror 15 from the superimposing lens 14, and transmits G light and B light each of which is a part of the light having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is a light modulation element. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light from the first dichroic mirror 15, and transmits the B light as a part of the light from the first dichroic mirror 15. The G light having been reflected by the second dichroic mirror 21 enters the liquid crystal panel 18G via the field lens 17G. The liquid crystal panel 18G is a light modulation element. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B and a cross dichroic prism 19. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is a light modulation element. The liquid crystal panel 18B modulates the B light in accordance with the image signal to thereby form a blue projection image.

The liquid crystal panel 18R, the liquid crystal panel 18G, and the liquid crystal panel 18B surround the cross dichroic prism 19 from three directions. The cross dichroic prism 19 is a light combining prism, and generates the projection image obtained by combining the light beams modulated by the respective liquid crystal panels 18R, 18G, and 18B with each other.

The optical system 3 projects the projection image combined by the cross dichroic prism 19 in an enlarged manner.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into image signals including the tones and so on of the respective colors. The display drive section 7 makes the liquid crystal panel 18R, the liquid crystal panel 18G, and the liquid crystal panel 18B operate based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Practical Example 1

Figure 2:
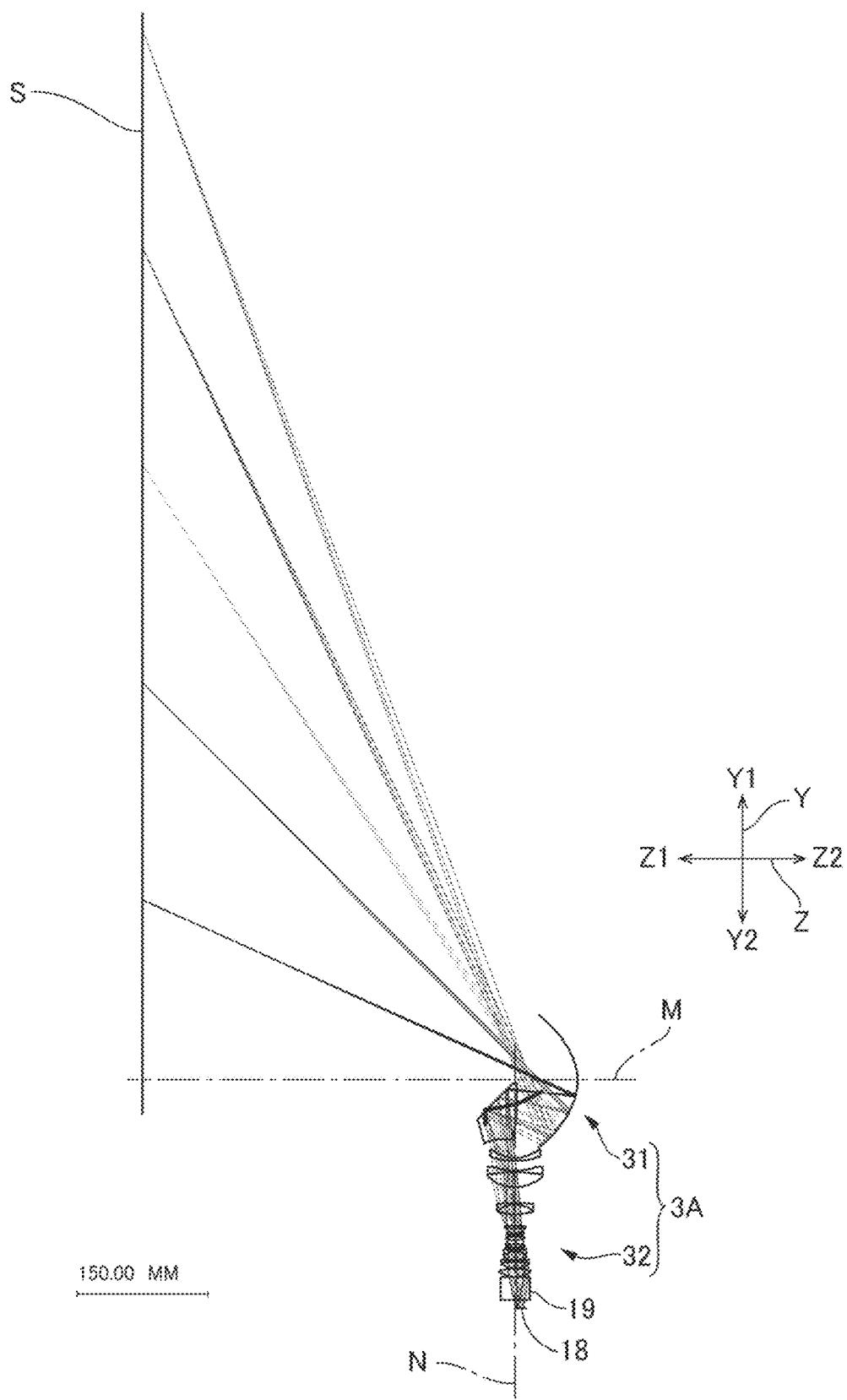
FIG. 2 is a ray chart schematically showing a whole of an optical system according to Practical Example 1.
Figure 3:
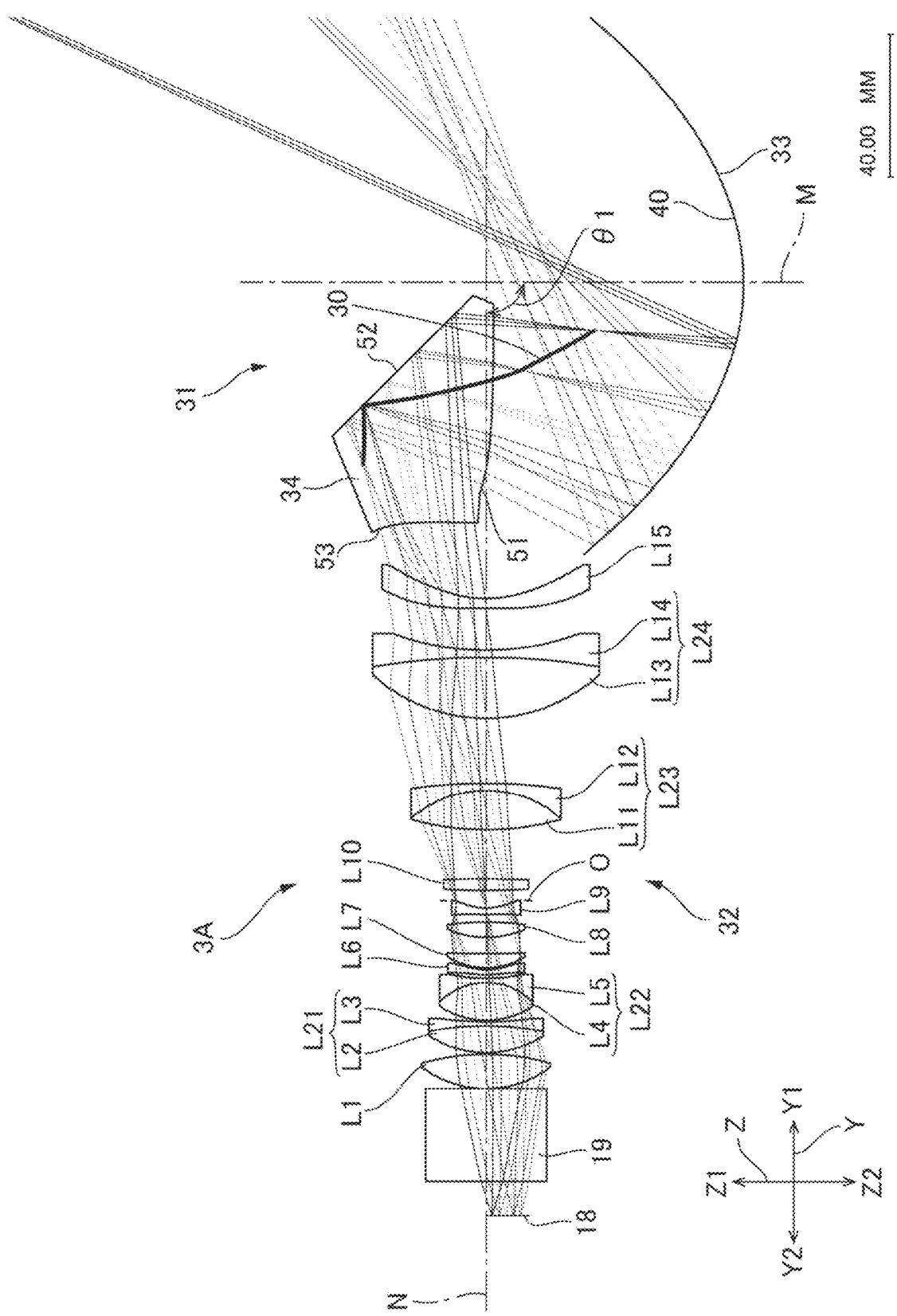
FIG. 3 is a ray chart of the optical system according to Practical Example 1.

FIG. 2 is a ray chart schematically showing a whole of an optical system according to Practical Example 1. FIG. 3 is a ray chart of the optical system 3A according to Practical Example 1. As shown in FIG. 2 and FIG. 3, on a reduction-side conjugated plane of the optical system 3A, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 2, the optical system 3A according to the present example has a first optical system 31 and a second optical system 32 disposed in sequence from an enlargement side toward a reduction side. The first optical system 31 is a reflective optical system. The first optical system 31 is provided with a first optical element 33 and a second optical element 34. The first optical element 33 and the second optical element 34 are arranged in this order from the enlargement side toward the reduction side. An optical axis M of the first optical element 33 extends along the Z-axis direction. In other words, the optical axis M of the first optical element 33 is perpendicular to the screen S. The second optical system 32 is a refracting optical system. An optical axis N (a sixth optical axis) of the second optical element 32 extends along the Y-axis direction. The screen S is located at the Z1 direction side of the optical axis N.

As shown in FIG. 3, the first optical element 33 is provided with a first reflecting surface 40 facing to the Z1 direction. The first reflecting surface 40 is provided with a concave shape concaved toward the Z2 direction. A first optical axis of the first reflecting surface 40 is the optical axis M of the first optical element 33. The first reflecting surface 40 is provided with a rotationally symmetric shape centering on the first optical axis. The first reflecting surface 40 is provided with an aspherical shape. Here, the first optical element 33 is designed using the optical axis M as a design axis. In other words, the first optical axis is a design optical axis of the first reflecting surface 40.

The second optical element 34 is formed of a single optical element. The second optical element 34 is located at the Z1 direction side of the first optical element 33. The second optical element 34 has a first transmission surface 51, a second reflecting surface 52 located at a reduction side of the first transmission surface 51, and a second transmission surface 53 located at a reduction side of the second reflecting surface 52.

The first transmission surface 51 is opposed in the Z-axis direction to the first reflecting surface 40. The first transmission surface 51 is provided with a convex shape facing to the Z2 direction. A second optical axis of the first transmission surface 51 is substantially parallel to the first optical axis of the first reflecting surface 40. In the present example, the second optical axis of the first transmission surface 51 coincides with the first optical axis of the first reflecting surface 40. In other words, the second optical axis of the first transmission surface 51 coincides with the optical axis M of the first optical element 33. The first transmission surface 51 is provided with a rotationally symmetric shape centering on the second optical axis. The first transmission surface 51 has positive power. The first transmission surface 51 is provided with an aspherical shape.

The second reflecting surface 52 is a plane mirror with no power. The second reflecting surface 52 is tilted 45° with respect to the Y axis and the Z axis. The second reflecting surface 52 folds the light path as much as 90° between the first transmission surface 51 and the second transmission surface 53. The second reflecting surface 52 is formed by disposing a reflective coating layer on the outer side surface at the Z1 direction side of the second optical element 34.

The second transmission surface 53 faces to the Y2 direction, and is opposed to a lens L15. An angle formed between the optical axis of the second transmission surface 53 and the second optical axis of the first transmission surface 51 is 90°. In other words, an angle formed between the optical axis of the second transmission surface 53 and the optical axis M of the first optical element 33 is 90°. Further, the optical axis of the second transmission surface 53 coincides with the optical axis N of the second optical system 32. The second transmission surface 53 is provided with a rotationally symmetric shape centering on the optical axis of the second transmission surface 53. The second transmission surface 53 has positive power. The second transmission surface 53 is provided with an aspherical shape.

As show in FIG. 3, the second optical system 32 is provided with 15 lenses L1 through L15. The lens L1 through the lens L15 are arranged in this order from the reduction side toward the enlargement side. In the present example, the lens L2 and the lens L3 are bonded to each other to form a first cemented lens L21. The lens L4 and the lens L5 are bonded to each other to form a second cemented lens L22. The lens L11 and the lens L12 are bonded to each other to form a third cemented lens L23. The lens L13 and the lens L14 are bonded to each other to form a fourth cemented lens L24. An aperture 0 is disposed between the lens L9 and the lens L10. The lens L6, the lens L9, and the lens L15 are each an aspherical lens provided with aspherical shapes on the both surfaces. Each of the lenses in the second optical system 32 is provided with a rotationally symmetric surface centering on the optical axis N.

Here, as shown in FIG. 3, the liquid crystal panel 18 arranged on the reduction-side conjugated plane of the optical system 3A forms the projection image at the Z2 direction side of the optical axis N. Further, an angle $\theta 1$ formed between the optical axis M of the first optical element 33 and the optical axis N of the second optical system 32 is no larger than 90°. In the present example, the angle $\theta 1$ formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 40 of the first optical element 33 toward the Z1 direction and the Y1 direction, and then reaches the screen S.

Further, as shown in FIG. 3, the optical system 3A forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 40 of the first optical element 33 and the second transmission surface 53 of the second optical element 34.

Lens data of the optical system 3A are as follows. Surface numbers are attached in sequence from the reduction side toward the enlargement side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFERENCE SYMBOL | SURFACE NUMBER | R | D | nd | vd | MODE | Y |
|---|---|---|---|---|---|---|---|
| 18 | 0 | 0.00000 | 9.500000 | | | REFRACTION | |
| 19 | 1 | 0.00000 | 25.910000 | 1.516330 | 64.14 | REFRACTION | 13.2340 |
| | 2 | 0.00000 | 0.000000 | | | REFRACTION | 15.9410 |
| L1 | 3 | 30.00000 | 9.600000 | 1.496999 | 81.55 | REFRACTION | 16.8000 |
| | 4 | −65.00000 | 0.400000 | | | REFRACTION | 16.6040 |
| L2 | 5 | 29.00000 | 7.600000 | 1.487490 | 70.24 | REFRACTION | 14.7810 |
| L3 | 6 | −78.00000 | 1.200000 | 1.805181 | 25.43 | REFRACTION | 13.9320 |
| | 7 | 95.00000 | 0.400000 | | | REFRACTION | 13.1020 |
| L4 | 8 | 23.60000 | 10.500000 | 1.516330 | 64.14 | REFRACTION | 12.1380 |
| L5 | 9 | −18.30000 | 1.200000 | 1.903658 | 31.32 | REFRACTION | 10.5330 |
| | 10 | 46.00000 | 0.964539 | | | REFRACTION | 9.8300 |
| L6 | *11 | 21.71241 | 1.400000 | 1.589130 | 61.15 | REFRACTION | 9.8090 |
| | *12 | 13.91712 | 0.500000 | | | REFRACTION | 9.7310 |
| L7 | 13 | 19.66000 | 4.000000 | 1.487490 | 70.24 | REFRACTION | 9.8790 |
| | 14 | 260.00000 | 2.500000 | | | REFRACTION | 9.7100 |
| | 15 | 0.00000 | 2.089661 | | | REFRACTION | 9.3700 |
| L8 | 16 | 27.70000 | 4.200000 | 1.846660 | 23.78 | REFRACTION | 9.8110 |
| | 17 | −78.00000 | 2.151218 | | | REFRACTION | 9.8000 |
| L9 | *18 | 76.98511 | 1.800000 | 1.743198 | 49.30 | REFRACTION | 8.7350 |
| | *19 | 15.61135 | 3.326970 | | | REFRACTION | 8.3580 |

-continued

| REFERENCE SYMBOL | SURFACE NUMBER | R | D | nd | vd | MODE | Y |
|---|---|---|---|---|---|---|---|
| O | 20 | 0.00000 | 1.584940 | | | REFRACTION | 12.0000 |
| L10 | 21 | 194.00000 | 3.200000 | 1.647689 | 33.79 | REFRACTION | 10.2490 |
| | 22 | −292.00000 | 13.749192 | | | REFRACTION | 11.0200 |
| L11 | 23 | 77.60000 | 11.000000 | 1.620041 | 36.26 | REFRACTION | 18.8520 |
| L12 | 24 | −32.00000 | 2.000000 | 1.805181 | 25.43 | REFRACTION | 19.2190 |
| | 25 | −152.50000 | 18.160002 | | | REFRACTION | 20.7470 |
| L13 | 26 | 47.40000 | 17.000000 | 1.581439 | 40.75 | REFRACTION | 30.0000 |
| L14 | 27 | −196.00000 | 2.000000 | 1.805181 | 25.43 | REFRACTION | 29.4690 |
| | 28 | 76.00000 | 11.661272 | | | REFRACTION | 28.5520 |
| L15 | *29 | 30854.59445 | 2.800000 | 1.531131 | 55.75 | REFRACTION | 30.6150 |
| | *30 | 34.26687 | 11.211681 | | | REFRACTION | 29.7720 |
| | 31 | 0.00000 | 10.000000 | | | REFRACTION | 29.8080 |
| 34 | *32 | 302.58304 | 67.000000 | 1.531131 | 55.75 | REFRACTION | 31.5050 |
| | 33 | 0.00000 | −2.000000 | 1.531131 | 55.75 | REFLECTION | 57.9590 |
| | *34 | −8554.05457 | −70.000000 | | | REFRACTION | 61.0680 |
| 33 | *35 | 63.34969 | 501.000000 | | | REFLECTION | 76.0200 |
| | 36 | 0.00000 | 0.000000 | | | REFRACTION | 1450.0980 |
| S | 37 | 0.00000 | 0.000000 | | | REFRACTION | 1450.0980 |

Aspheric coefficients are as follows.

| SURFACE NUMBER | 11 | 12 | 18 | 19 |
|---|---|---|---|---|
| CONIC CONSTANT | 1.568E+00 | −1.3E+00 | −1E+00 | −8.8E−01 |
| 4-TH-ORDER COEFFICIENT | −3.529091E−04 | −2.989935E−04 | −1.136128E−04 | −8.485042E−05 |
| 6-TH-ORDER COEFFICIENT | 1.857039E−06 | 2.247788E−06 | 0 | 1.263136E−07 |
| 8-TH-ORDER COEFFICIENT | −4.616195E−09 | −8.694758E−09 | 0 | 4.873501E−11 |
| 10-TH-ORDER COEFFICIENT | 0 | 1.514578E−11 | 0 | 0 |

| SURFACE NUMBER | 29 | 30 | 32 |
|---|---|---|---|
| CONIC CONSTANT | 9E+01 | 0 | −2.463741E+02 |
| 4-TH-ORDER COEFFICIENT | 1.94923E−05 | −5.224166E−06 | −3.402535E−06 |
| 6-TH-ORDER COEFFICIENT | −3.426125E−08 | −3.962571E−09 | 5.756798E−10 |
| 8-TH-ORDER COEFFICIENT | 4.318007E−11 | −1.23371E−12 | −8.070441E−13 |
| 10-TH-ORDER COEFFICIENT | −3.081249E−14 | 1.164683E−14 | 0 |
| 12-TH-ORDER COEFFICIENT | 9.350359E−18 | −1.451055E−17 | 0 |
| 14-TH-ORDER COEFFICIENT | 0 | 4.754714E−21 | 0 |

| SURFACE NUMBER | 34 | 35 |
|---|---|---|
| CONIC CONSTANT | −5E−01 | −1E+00 |
| 4-TH-ORDER COEFFICIENT | 2.548342E−07 | −1.550607E−07 |
| 6-TH-ORDER COEFFICIENT | −8.423093E−12 | 3.752303E−11 |
| 8-TH-ORDER COEFFICIENT | 6.568096E−15 | −1.948136E−15 |
| 10-TH-ORDER COEFFICIENT | 1.660894E−18 | −5.494016E−19 |
| 12-TH-ORDER COEFFICIENT | −4.287004E−22 | 1.640171E−22 |
| 14-TH-ORDER COEFFICIENT | 5.558963E−26 | −1.457357E−26 |

Ray coordinates on an object surface are as follows.

| RAY NUMBER | X COORDINATE | Y COORDINATE |
|---|---|---|
| 1 | 0 | 1.67 |
| 2 | 0 | 3.67 |
| 3 | 0 | 5.67 |
| 4 | 0 | 7.67 |
| 5 | 0 | 9.67 |

Further, in the present example, the surface number 33 is an eccentric surface. Parameters of the eccentric surface are as follows.

| SURFACE NUMBER 33 | |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | −45.0000 |

Functions and Advantages

In the optical system 3A according to the present example, the first optical element 33 arranged at an enlargement extreme side has the first reflecting surface 40 having a concave shape. The second optical element 34 arranged at a reduction side of the first optical element 33 has the first transmission surface 51, the second reflecting surface 52 arranged at a reduction side of the first transmission surface 51, and the second transmission surface 53 arranged at a reduction side of the second reflecting surface 52. The first optical axis of the first reflecting surface 40 coincides with the second optical axis of the first transmission surface 51. The first transmission surface 51 and the second transmission surface 53 each have positive power.

According to the present example, the second optical element 34 provided with the first transmission surface 51 for projecting the projection light toward the first optical element 33 is provided with power. Thus, since it is possible to control a spread and a direction of the light from the first transmission surface 51 toward the first reflecting surface 40, it becomes possible to shorten the air gap between the first optical element 33 and the second optical element 34. Therefore, it becomes easy to control the projection light on the first reflecting surface 40 of the first optical element 33. Therefore, it is possible to project an enlarged image in which the aberration is corrected in good condition on the screen S. Further, since it becomes possible to shorten the air gap between the first optical element 33 and the second optical element 34, it becomes possible to reduce the optical system in size.

Further, in the present example, the angle θ1 formed between the optical axis M of the first optical element 33 and the optical axis N of the second optical system 32 is no larger than 90°. Thus, the optical elements to be arranged at the enlargement side of the second optical element 34 can be arranged in a direction parallel to the enlargement-side imaging plane, or a direction of getting away from the enlargement-side imaging plane. Therefore, it is possible to prevent the optical elements to be arranged at the enlargement side of the second optical element 34 from interfering with the enlargement-side imaging plane. Therefore, it is possible to arrange the optical system at a position close to the screen S.

Further, in the present example, the intermediate image 30 which is conjugated with the reduction-side conjugated plane and the enlargement-side conjugated plane is formed between the first reflecting surface 40 of the first optical element 33 and the second transmission surface 53 of the second optical element 34. Thus, the second optical element 34 provided with power is located in the vicinity of the intermediate image 30. Therefore, in the intermediate image, it is possible to prevent a chromatic aberration or the like from occurring.

In the present example, the second optical system 32 arranged at the reduction side of the second optical element 34 is a refracting optical system. The refracting optical system is provided with a plurality of lenses, and the plurality of lenses is each provided with a rotationally symmetric surface centering on the optical axis N. By adopting such a configuration, it becomes easy to manufacture the second optical system 32.

Figure 4:
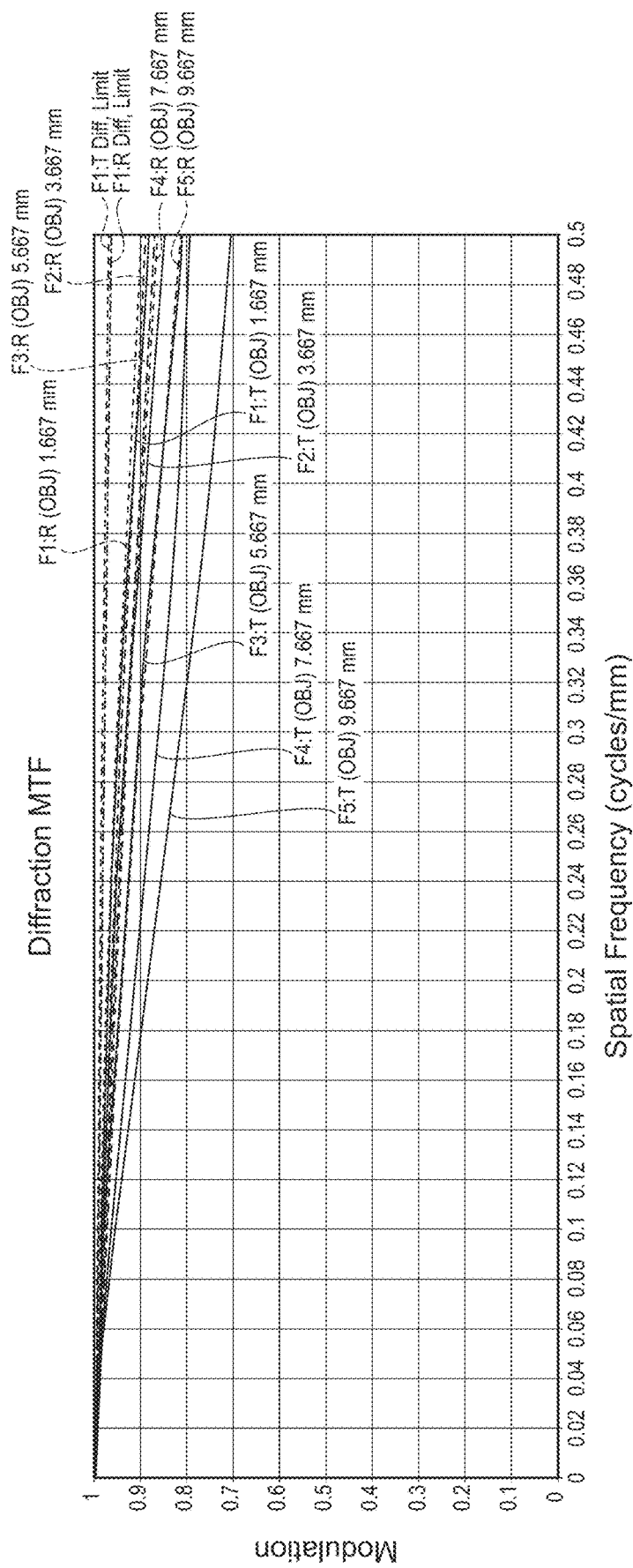
FIG. 4 is a diagram showing an MTF at an enlargement side of the optical system according to Practical Example 1.

FIG. 4 is a diagram showing an MTF at the enlargement side of the optical system 3A. In FIG. 4, the horizontal axis represents a spatial frequency, and the vertical axis represents a contrast reproduction rate. As shown in FIG. 4, the optical system 3A according to the present example is high in resolution.

Figure 5:
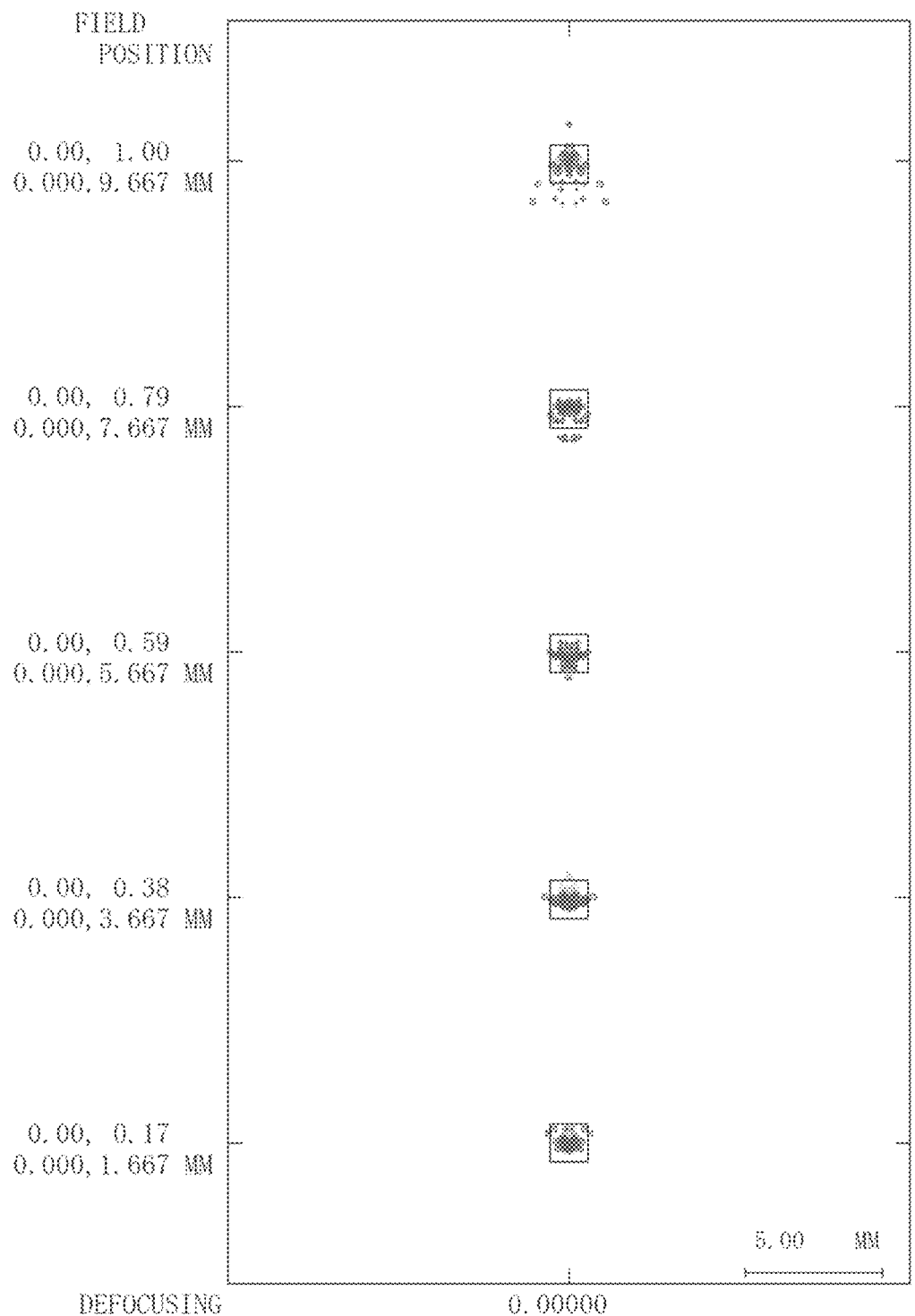
FIG. 5 is a spot diagram of the optical system according to Practical Example 1.

FIG. 5 is a spot diagram of the optical system 3A. As shown in FIG. 5, in the present example, a variation in spot is suppressed.

Practical Example 2

Figure 6:
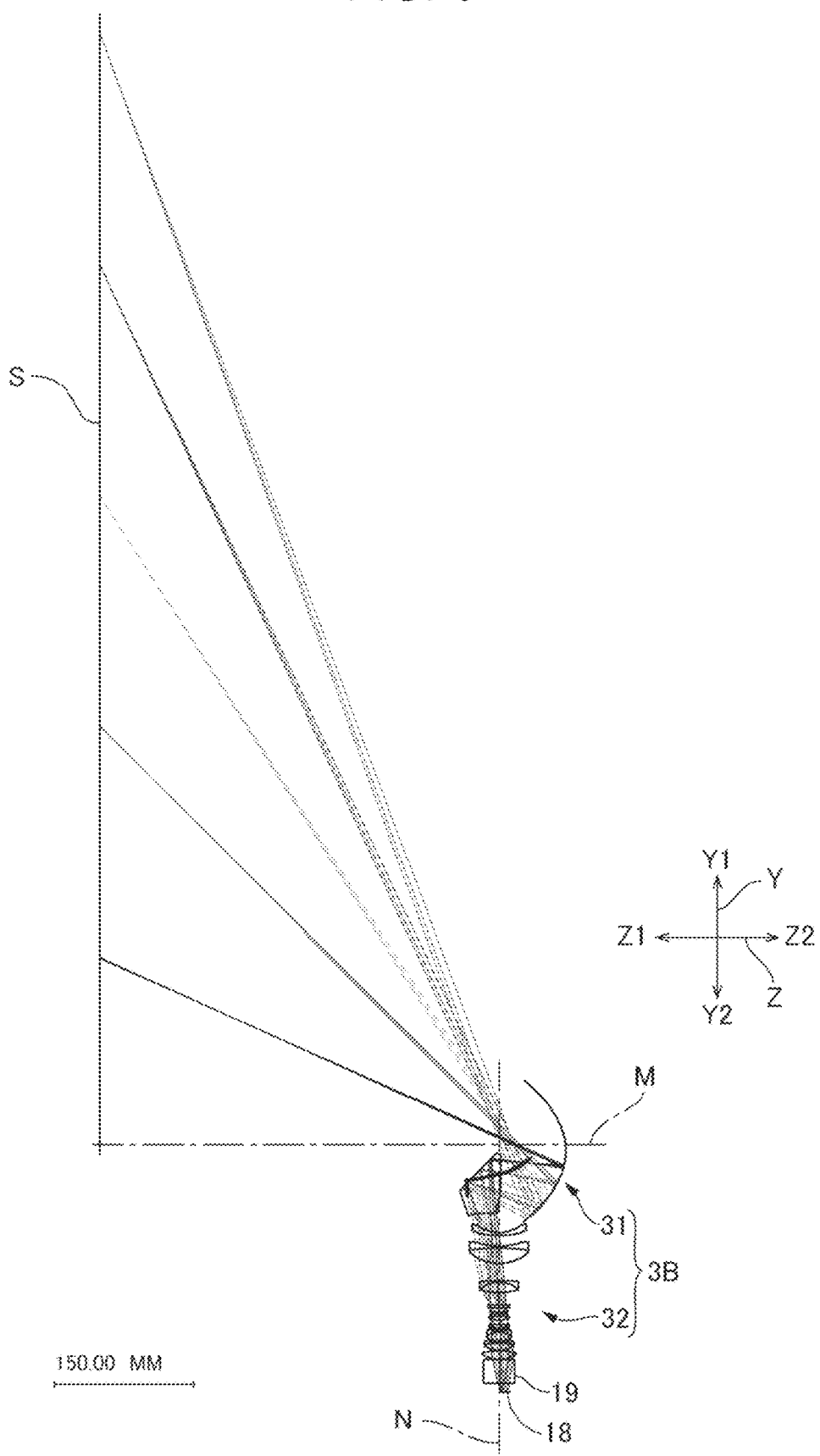
FIG. 6 is a ray chart schematically showing a whole of an optical system according to Practical Example 2.
Figure 7:
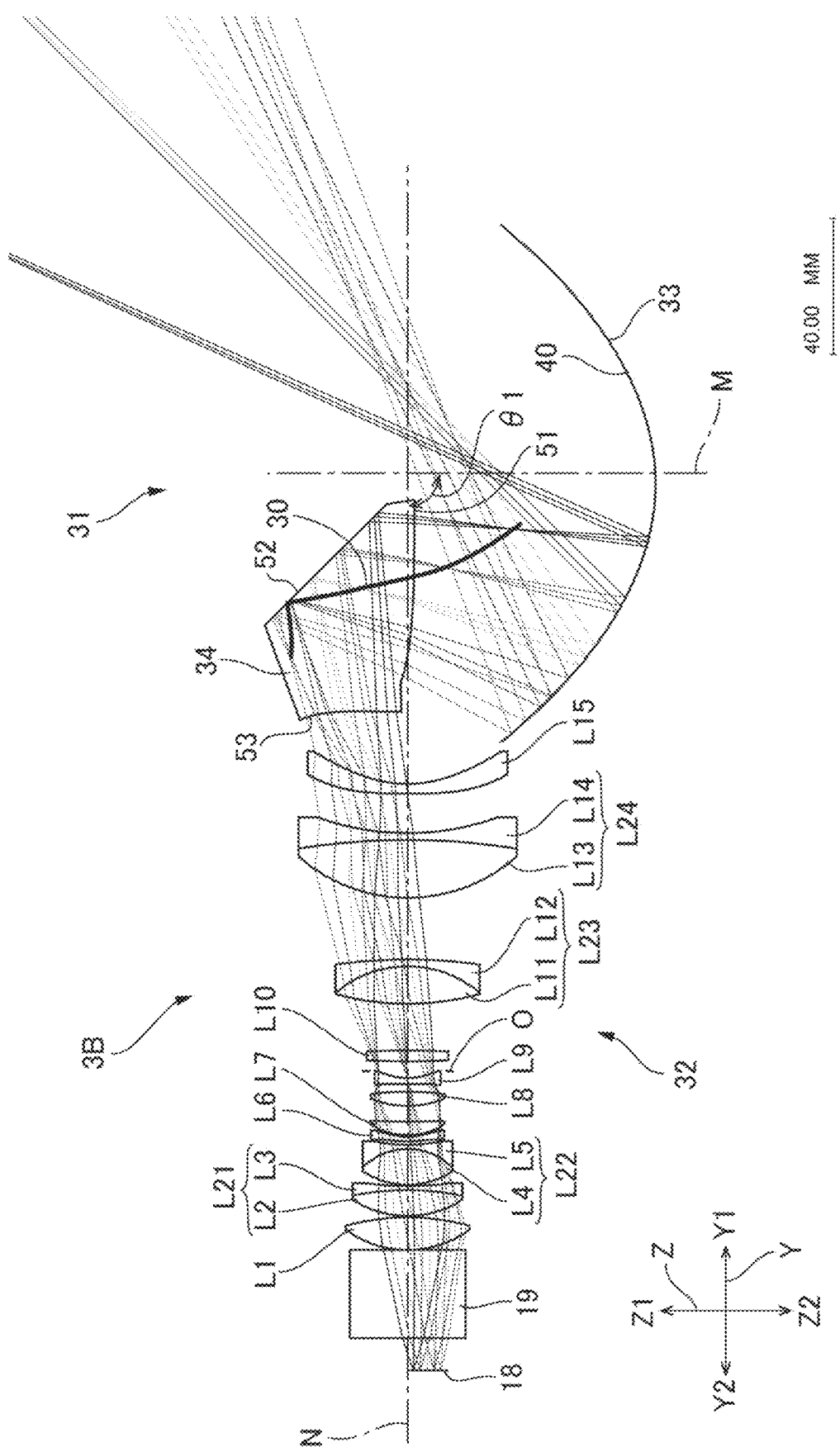
FIG. 7 is a ray chart of the optical system according to Practical Example 2.

FIG. 6 is a ray chart schematically showing a whole of an optical system according to Practical Example 2. FIG. 7 is a ray chart of the optical system 3B according to Practical Example 2. As shown in FIG. 6 and FIG. 7, on a reduction-side conjugated plane of the optical system 3B, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 6, the optical system 3B according to the present example has a first optical system 31 and a second optical system 32 disposed in sequence from an enlargement side toward a reduction side. The first optical system 31 is a reflective optical system. The first optical system 31 is provided with a first optical element 33 and a second optical element 34. The first optical element 33 and the second optical element 34 are arranged in this order from the enlargement side toward the reduction side. An optical axis M of the first optical element 33 extends along the Z-axis direction. In other words, the optical axis M of the first optical element 33 is perpendicular to the screen S. The second optical system 32 is a refracting optical system. An optical axis N (a sixth optical axis) of the second optical system 32 extends along the Y-axis direction. The screen S is located at the Z1 direction side of the optical axis N.

As shown in FIG. 7, the first optical element 33 is provided with a first reflecting surface 40 facing to the Z1 direction. The first reflecting surface 40 is provided with a concave shape concaved toward the Z2 direction. A first optical axis of the first reflecting surface 40 is the optical axis M of the first optical element 33. The first reflecting surface 40 is provided with a rotationally symmetric shape centering on the first optical axis. The first reflecting surface 40 is provided with an aspherical shape. Here, the first optical element 33 is designed using the optical axis M as a design axis. In other words, the first optical axis is a design optical axis of the first reflecting surface 40.

The second optical element 34 is formed of a single optical element. The second optical element 34 is located at the Z1 direction side of the first optical element 33. The second optical element 34 has a first transmission surface 51, a second reflecting surface 52 located at a reduction side of the first transmission surface 51, and a second transmission surface 53 located at a reduction side of the second reflecting surface 52.

The first transmission surface 51 is opposed in the Z-axis direction to the first reflecting surface 40. The first transmission surface 51 is provided with a convex shape facing to the Z2 direction. A second optical axis of the first transmission surface 51 is substantially parallel to the first optical axis of the first reflecting surface 40. In the present example, the second optical axis of the first transmission surface 51 coincides with the first optical axis of the first reflecting surface 40. In other words, the second optical axis of the first transmission surface 51 coincides with the optical axis M of the first optical element 33. The first transmission surface 51 is provided with a rotationally symmetric shape centering on the second optical axis. The first transmission surface 51 has positive power. The first transmission surface 51 is provided with an aspherical shape.

The second reflecting surface 52 is a mirror provided with a nonplanar shape. Here, the nonplanar shape includes an aspherical shape and a free-form surface shape. In the present example, the second reflecting surface 52 is provided with an aspherical shape. The second reflecting surface 52 is tilted 45° with respect to the Y axis and the Z axis. The second reflecting surface 52 folds the light path as much as 90° between the first transmission surface 51 and the second transmission surface 53. The second reflecting surface 52 is formed by disposing a reflective coating layer on the outer side surface at the Z1 direction side of the second optical element 34.

The second transmission surface 53 faces to the Y2 direction, and is opposed to a lens L15. An angle formed between the optical axis of the second transmission surface 53 and the second optical axis of the first transmission surface 51 is 90°. In other words, an angle formed between the optical axis of the second transmission surface 53 and the optical axis M of the first optical element 33 is 90°. Further, the optical axis of the second transmission surface 53 coincides with the optical axis N of the second optical system 32. The second transmission surface 53 is provided with a rotationally symmetric shape centering on the optical axis of the second transmission surface 53. The second transmission surface 53 has positive power. The second transmission surface 53 is provided with an aspherical shape.

As show in FIG. 7, the second optical system 32 is provided with 15 lenses L1 through L15. The lens L1 through the lens L15 are arranged in this order from the reduction side toward the enlargement side. In the present example, the lens L2 and the lens L3 are bonded to each other to form a first cemented lens L21. The lens L4 and the lens L5 are bonded to each other to form a second cemented lens L22. The lens L11 and the lens L12 are bonded to each other to form a third cemented lens L23. The lens L13 and the lens L14 are bonded to each other to form a fourth cemented lens L24. An aperture 0 is disposed between the lens L9 and the lens L10. The lens L6, the lens L9, and the lens L15 are each an aspherical lens provided with aspherical shapes on the both surfaces. Each of the lenses in the second optical system 32 is provided with a rotationally symmetric surface centering on the optical axis N.

Here, as shown in FIG. 7, the liquid crystal panel 18 arranged on the reduction-side conjugated plane of the optical system 3B forms the projection image at the Z2 direction side of the optical axis N. Further, an angle θ1 formed between the optical axis M of the first optical element 33 and the optical axis N of the second optical system 32 is no larger than 90°. In the present example, the angle θ1 formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 40 of the first optical element 33 toward the Z1 direction and the Y1 direction, and then reaches the screen S.

Further, as shown in FIG. 7, the optical system 3B forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 40 of the first optical element 33 and the second transmission surface 53 of the second optical element 34.

Lens data of the optical system 3B are as follows. Surface numbers are attached in sequence from the reduction side toward the enlargement side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFERENCE SYMBOL | SURFACE NUMBER | R | D | nd | vd | MODE | Y |
|---|---|---|---|---|---|---|---|
| 18 | 0 | 0.00000 | 9.500000 | | | REFRACTION | |
| 19 | 1 | 0.00000 | 25.910000 | 1.516330 | 64.14 | REFRACTION | 13.2340 |
| | 2 | 0.00000 | 0.000000 | | | REFRACTION | 15.6340 |

-continued

| REFERENCE SYMBOL | SURFACE NUMBER | R | D | nd | vd | MODE | Y |
|---|---|---|---|---|---|---|---|
| L1 | 3 | 30.00000 | 9.600000 | 1.496999 | 81.55 | REFRACTION | 16.8000 |
|  | 4 | −65.00000 | 0.400000 |  |  | REFRACTION | 16.6020 |
| L2 | 5 | 29.00000 | 7.600000 | 1.487490 | 70.24 | REFRACTION | 14.7630 |
| L3 | 6 | −78.00000 | 1.200000 | 1.805181 | 25.43 | REFRACTION | 13.8940 |
|  | 7 | 95.00000 | 0.400000 |  |  | REFRACTION | 13.0200 |
| L4 | 8 | 23.60000 | 10.500000 | 1.516330 | 64.14 | REFRACTION | 11.9960 |
| L5 | 9 | −18.30000 | 1.200000 | 1.903658 | 31.32 | REFRACTION | 10.3230 |
|  | 10 | 46.00000 | 0.964539 |  |  | REFRACTION | 9.7120 |
| L6 | *11 | 21.71241 | 1.400000 | 1.589130 | 61.15 | REFRACTION | 9.7010 |
|  | *12 | 13.91712 | 0.500000 |  |  | REFRACTION | 9.6570 |
| L7 | 13 | 19.66000 | 4.000000 | 1.487490 | 70.24 | REFRACTION | 9.8250 |
|  | 14 | 260.00000 | 2.500000 |  |  | REFRACTION | 9.6710 |
|  | 15 | 0.00000 | 2.089661 |  | 23.78 | REFRACTION | 9.3700 |
| L8 | 16 | 27.70000 | 4.200000 | 1.846660 |  | REFRACTION | 9.8110 |
|  | 17 | −78.00000 | 2.151218 |  |  | REFRACTION | 9.8000 |
| L9 | *18 | 77.68045 | 1.800000 | 1.743198 | 49.30 | REFRACTION | 8.7360 |
|  | *19 | 15.64096 | 3.326970 |  |  | REFRACTION | 8.3600 |
| O | 20 | 0.00000 | 1.584940 |  | 33.79 | REFRACTION | 12.0000 |
| L10 | 21 | 194.00000 | 3.200000 | 1.647689 |  | REFRACTION | 10.1370 |
|  | 22 | −292.00000 | 13.749192 |  |  | REFRACTION | 10.8660 |
| L11 | 23 | 77.60000 | 11.000000 | 1.620041 | 36.26 | REFRACTION | 17.8780 |
| L12 | 24 | −32.00000 | 2.000000 | 1.805181 | 25.43 | REFRACTION | 18.3410 |
|  | 25 | −152.50000 | 18.160002 |  |  | REFRACTION | 19.6460 |
| L13 | 26 | 47.40000 | 17.000000 | 1.581439 | 40.75 | REFRACTION | 30.0000 |
| L14 | 27 | −196.00000 | 2.000000 | 1.805181 | 25.43 | REFRACTION | 26.1240 |
|  | 28 | 76.00000 | 11.661272 |  |  | REFRACTION | 25.5120 |
| L15 | *29 | 4309.39295 | 2.800000 | 1.531131 | 55.75 | REFRACTION | 27.4050 |
|  | *30 | 34.15409 | 11.211681 |  |  | REFRACTION | 26.8130 |
|  | 31 | 0.00000 | 10.000000 |  |  | REFRACTION | 27.2800 |
| 34 | *32 | 313.53737 | 67.000000 | 1.531131 | 55.75 | REFRACTION | 29.2980 |
|  | *33 | −103885.77749 | −2.000000 | 1.531131 | 55.75 | REFLECTION | 55.6670 |
|  | *34 | 19040.67849 | −70.000000 |  |  | REFRACTION | 56.3870 |
| 33 | *35 | 63.27787 | 501.000000 |  |  | REFLECTION | 73.4220 |
|  | 36 | 0.00000 | 0.000000 |  |  | REFRACTION | 1209.1380 |
| S | 37 | 0.00000 | 0.000000 |  |  | REFRACTION | 1209.1380 |

Aspheric coefficients are as follows.

| SURFACE NUMBER | 11 | 12 | 18 | 19 |
|---|---|---|---|---|
| CONIC CONSTANT | 1.568E+00 | −1.3E+00 | −1E+00 | −8.8E−01 |
| 4-TH-ORDER COEFFICIENT | −3.529091E−04 | −2.989935E−04 | −1.132643E−04 | −8.464936E−05 |
| 6-TH-ORDER COEFFICIENT | 1.857039E−06 | 2.247788E−06 | 0 | 1.292515E−07 |
| 8-TH-ORDER COEFFICIENT | −4.616195E−09 | −8.694758E−09 | 0 | 3.109839E−11 |
| 10-TH-ORDER COEFFICIENT | 0 | 1.514578E−11 | 0 | 0 |

| SURFACE NUMBER | 29 | 30 | 32 |
|---|---|---|---|
| CONIC CONSTANT | 9E+01 | 0 | −3.054475E+02 |
| 4-TH-ORDER COEFFICIENT | 1.946184E−05 | −5.220573E−06 | −3.393991E−06 |
| 6-TH-ORDER COEFFICIENT | −3.421317E−08 | −3.911385E−09 | 6.733864E−10 |
| 8-TH-ORDER COEFFICIENT | 4.344816E−11 | −1.18385E−12 | −9.366763E−13 |
| 10-TH-ORDER COEFFICIENT | −3.071711E−14 | 1.189918E−14 | 0 |

-continued

| | | | |
|---|---|---|---|
| 12-TH-ORDER COEFFICIENT | 9.210641E−18 | −1.44075E−17 | 0 |
| 14-TH-ORDER COEFFICIENT | 0 | 4.539799E−21 | 0 |

| SURFACE NUMBER | 33 | 34 | 35 |
|---|---|---|---|
| CONIC CONSTANT | 6.8E+05 | −5E−01 | −1E+00 |
| 4-TH-ORDER COEFFICIENT | 7.865978E−06 | 2.707534E−07 | −1.582381E−07 |
| 6-TH-ORDER COEFFICIENT | −3.645436E−07 | −9.732092E−12 | 3.754637E−11 |
| 8-TH-ORDER COEFFICIENT | 3.761944E−07 | 5.614726E−15 | −1.909969E−15 |
| 10-TH-ORDER COEFFICIENT | −3.846650E−07 | 1.622204E−18 | −5.570042E−19 |
| 12-TH-ORDER COEFFICIENT | 0 | −3.79798E−22 | 1.578769E−22 |
| 14-TH-ORDER COEFFICIENT | 0 | 4.501296E−26 | −1.341184E−26 |

Ray coordinates on an object surface are as follows.

| RAY NUMBER | X COORDINATE | Y COORDINATE |
|---|---|---|
| 1 | 0 | 1.67 |
| 2 | 0 | 3.67 |
| 3 | 0 | 5.67 |
| 4 | 0 | 7.67 |
| 5 | 0 | 9.67 |

Further, in the present example, the surface number 33 is an eccentric surface. Parameters of the eccentric surface are as follows.

| SURFACE NUMBER 33 | |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | −45.0000 |

Functions and Advantages

The optical system 3B according to the present example is capable of obtaining substantially the same functions and advantages as those of the optical system 3A according to Practical Example 1. Further, in the present example, the second reflecting surface 52 is provided with a nonplanar shape. In other words, the second reflecting surface 52 is an aspherical surface or a free-form surface. Specifically, the second reflecting surface 52 is provided with an aspherical shape. Therefore, it is easier to correct a variety of aberrations in the intermediate image 30.

Figure 8:
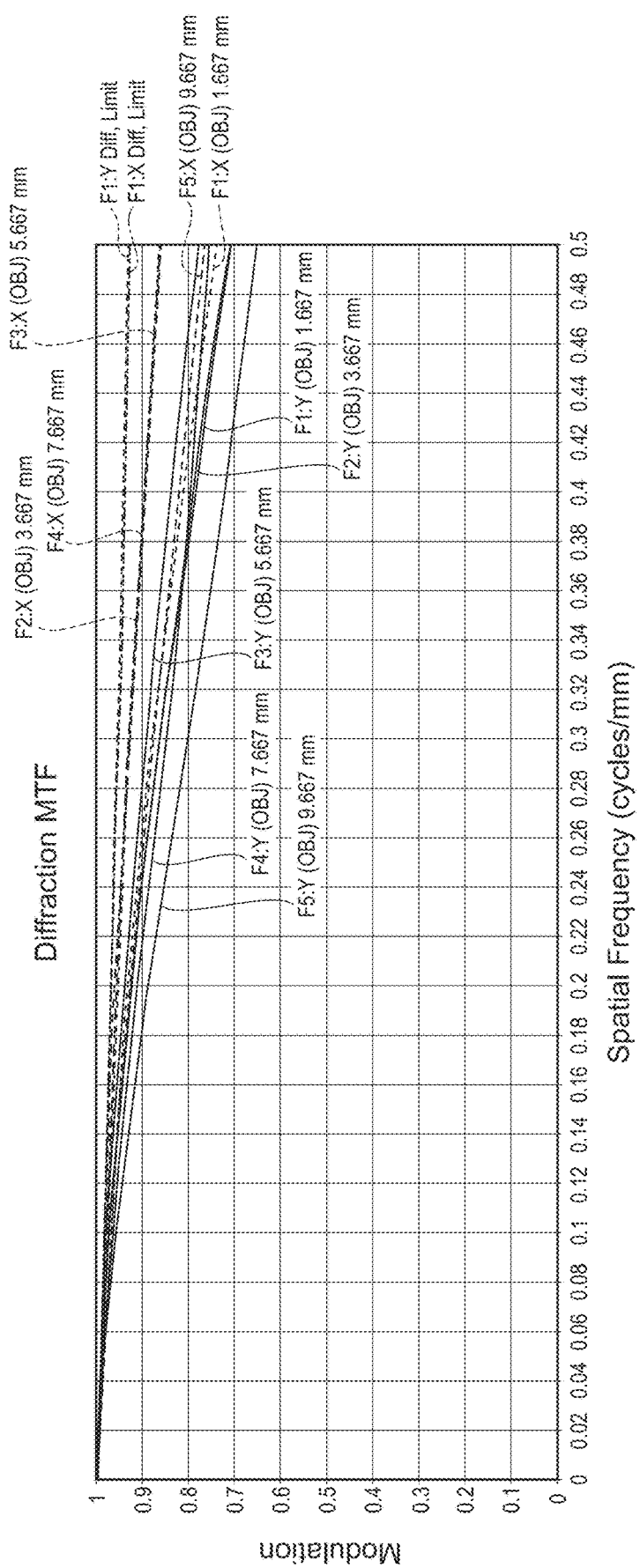
FIG. 8 is a diagram showing an MTF at an enlargement side of the optical system according to Practical Example 2.

FIG. 8 is a diagram showing an MTF at the enlargement side of the optical system 3B. In FIG. 8, the horizontal axis represents a spatial frequency, and the vertical axis represents a contrast reproduction rate. As shown in FIG. 8, the optical system 3B according to the present example is high in resolution.

Figure 9:
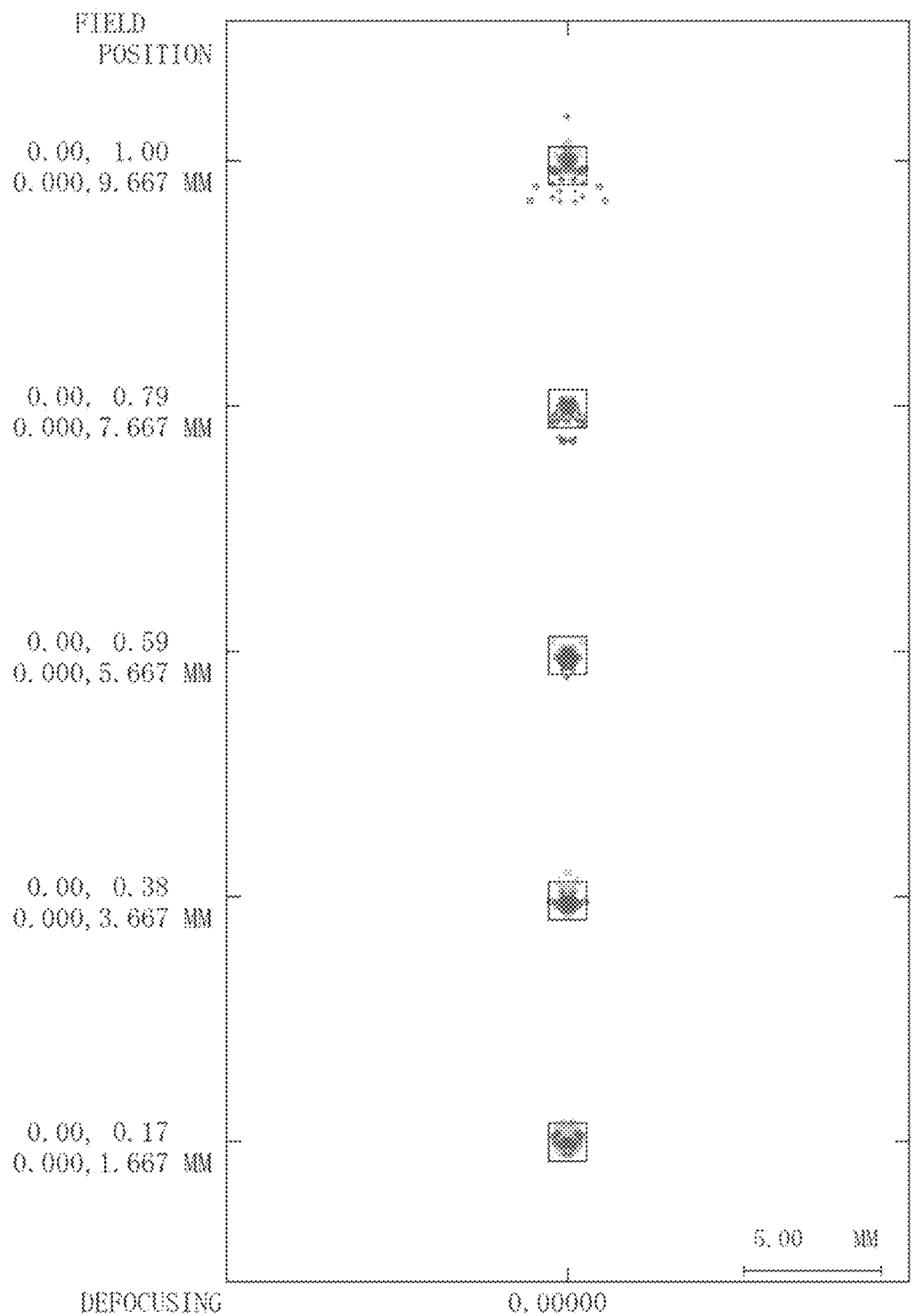
FIG. 9 is a spot diagram of the optical system according to Practical Example 2.

FIG. 9 is a spot diagram of the optical system 3B. As shown in FIG. 9, in the present example, a variation in spot is suppressed.

Practical Example 3

Figure 10:
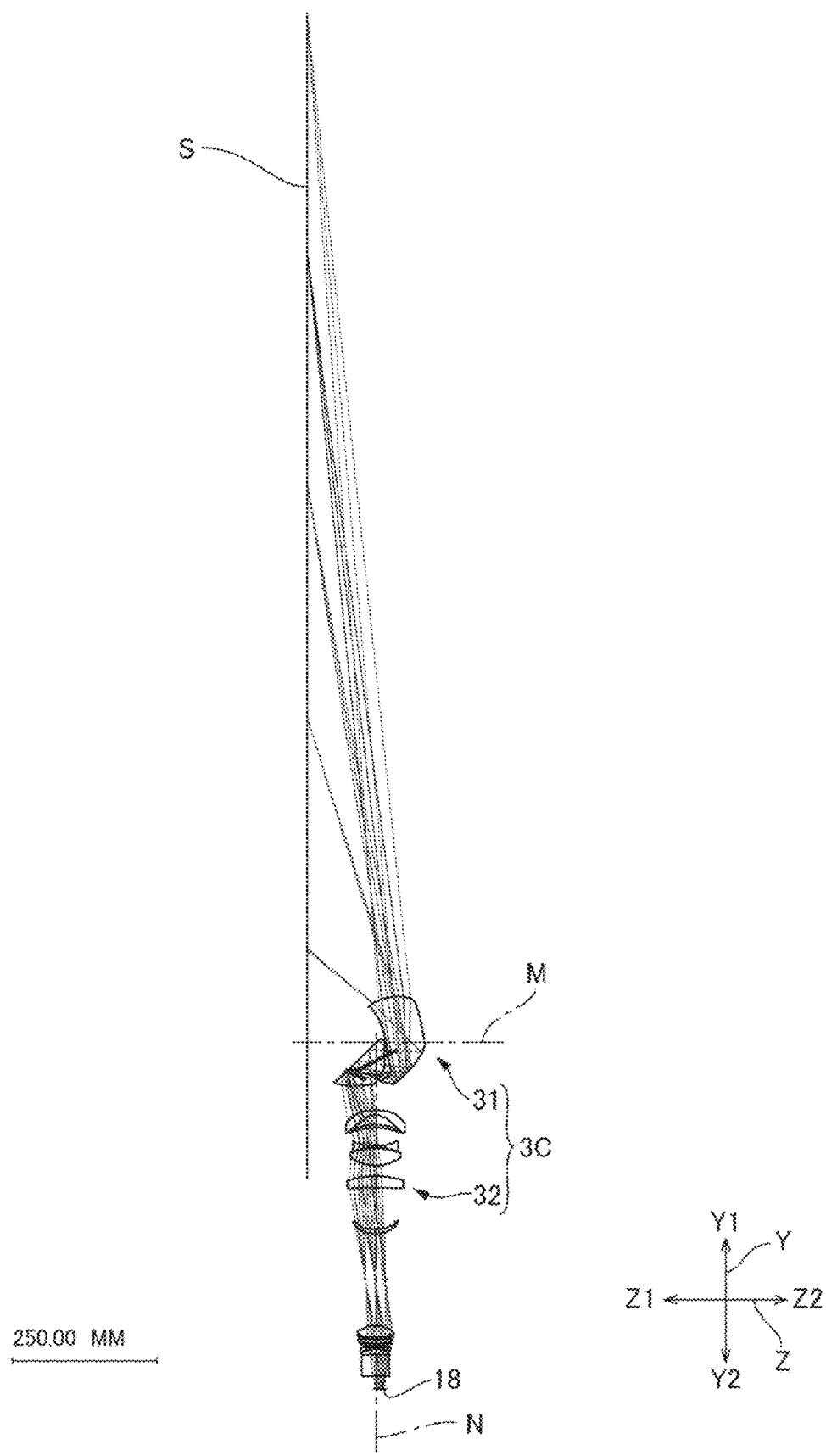
FIG. 10 is a ray chart schematically showing a whole of an optical system according to Practical Example 3.
Figure 11:
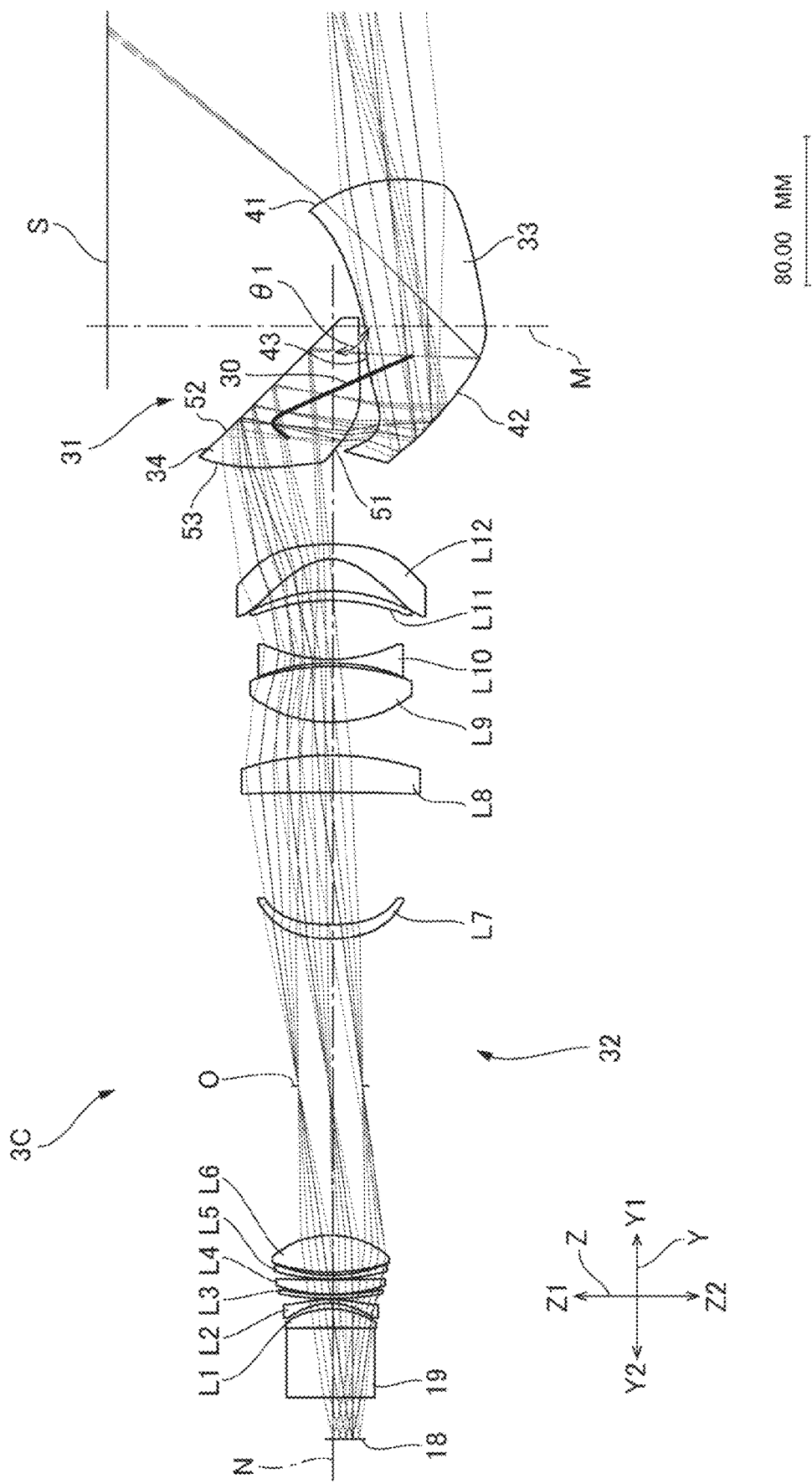
FIG. 11 is a ray chart of the optical system according to Practical Example 3.
Figure 12:
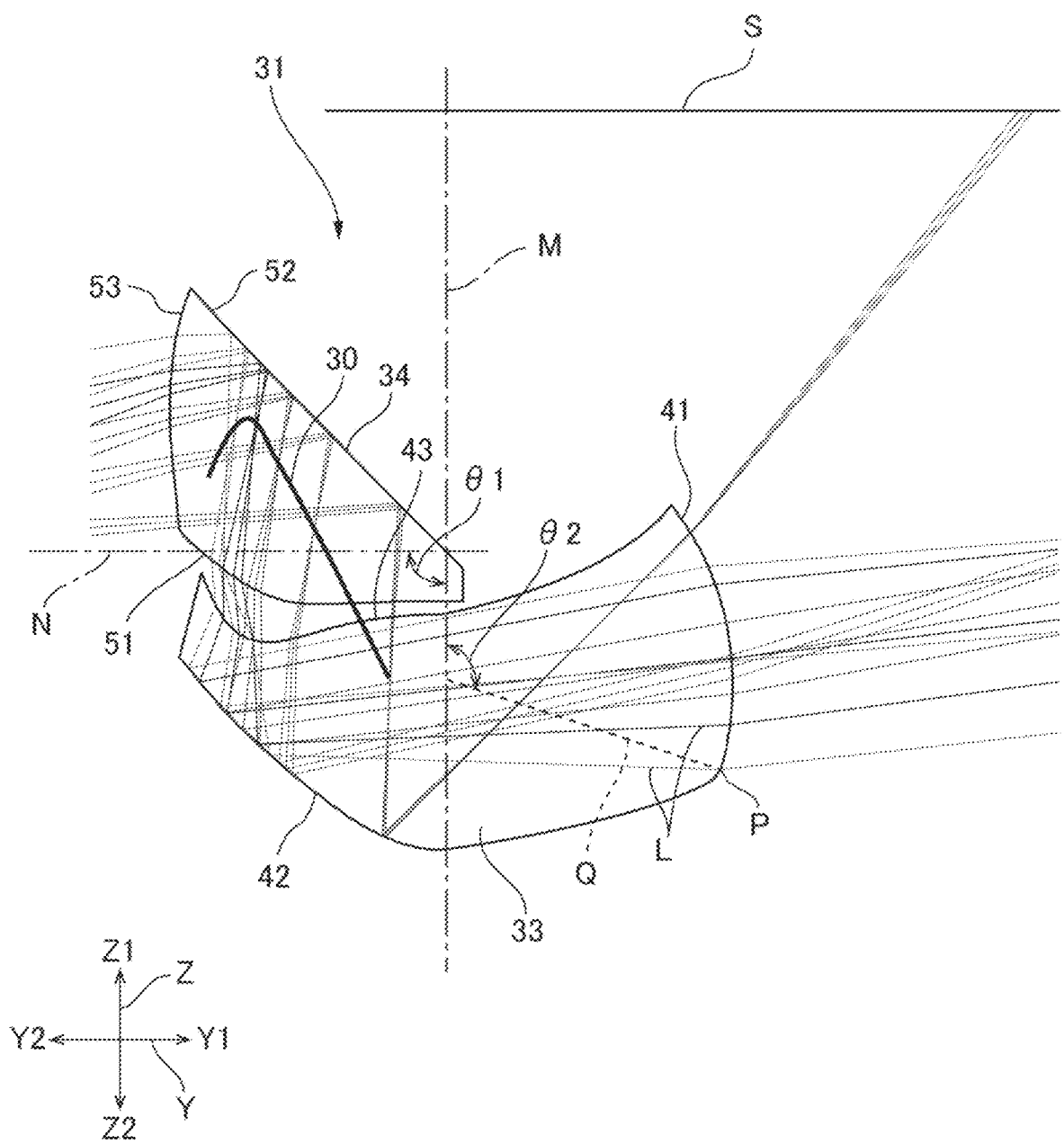
FIG. 12 is a ray chart of a first optical system in Practical Example 3.

FIG. 10 is a ray chart schematically showing a whole of an optical system according to Practical Example 3. FIG. 11 is a ray chart of the optical device 3C according to Practical Example 3. FIG. 12 is a ray chart of a first optical system in Practical Example 3. As shown in FIG. 10 and FIG. 11, on a reduction-side conjugated plane of the optical system 3C, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 10, the optical system 3C according to the present example has a first optical system 31 and a second optical system 32 disposed in sequence from an enlargement side toward a reduction side. The first optical system 31 is a reflective optical system. The first optical system 31 is provided with a first optical element 33 and a second optical element 34. The first optical element 33 and the second optical element 34 are arranged in this order from the enlargement side toward the reduction side. An optical axis M of the first optical element 33 extends along the Z-axis direction. In other words, the optical axis M of the first optical element 33 is perpendicular to the screen S. The second optical system 32 is a refracting optical system. An optical axis N (a sixth optical axis) of the second optical system 32 extends along the Y-axis direction. The screen S is located at the Z1 direction side of the optical axis N.

As shown in FIG. 11, the first optical element 33 is formed of a single optical element. The first optical element 33 is located at the Z2 direction side of the second optical element 34. The first optical element 33 has a third transmission surface 41, a first reflecting surface 42 located at a reduction side of the third transmission surface 41, and a fourth transmission surface 43 located at a reduction side of the first reflecting surface 42.

The third transmission surface 41 is provided with a convex shape facing to the Y1 direction. A third optical axis of the third transmission surface 41 coincides with the optical axis M of the first optical system 31. The third transmission surface 41 is provided with a rotationally symmetric shape centering on the third optical axis of the third transmission surface 41. The third transmission surface 41 has positive power.

The first reflecting surface 42 is located at the Y2 direction side of the third transmission surface 41. The first reflecting surface 42 is provided with a concave shape concaved toward the Z2 direction. A first optical axis of the first reflecting surface 42 coincides with the optical axis M of the first optical system 31. The first reflecting surface 42 is provided with a rotationally symmetric shape centering on the first optical axis of the first reflecting surface 42. The first reflecting surface 42 has positive power. The first reflecting surface 42 is provided with an aspherical shape. The first reflecting surface 42 is formed by disposing a reflective coating layer on the outer side surface at the Z2 direction side of the first optical element 33.

A fourth optical axis of the fourth transmission surface 43 coincides with the optical axis M of the first optical system 31. The fourth transmission surface 43 is provided with a rotationally symmetric shape centering on the fourth optical axis of the fourth transmission surface 43. The fourth transmission surface 43 has positive power. The fourth transmission surface 43 is provided with an aspherical shape.

Here, the first optical element 33 is designed using the optical axis M as a design axis. In other words, the third optical axis is a design optical axis of the third transmission surface 41. The first optical axis is a design optical axis of the first reflecting surface 42. The fourth optical axis is a design optical axis of the fourth transmission surface 43.

The second optical element 34 is formed of a single optical element. The second optical element 34 is located at the Z1 direction side of the first optical element 33. The second optical element 34 has a first transmission surface 51, a second reflecting surface 52 located at a reduction side of the first transmission surface 51, and a second transmission surface 53 located at a reduction side of the second reflecting surface 52.

The first transmission surface 51 is opposed in the Z-axis direction to the fourth transmission surface 43. The first transmission surface 51 is provided with a convex shape facing to the Z2 direction. A second optical axis of the first transmission surface 51 is substantially parallel to the first optical axis of the first reflecting surface 42. In the present example, the second optical axis of the first transmission surface 51 coincides with the first optical axis of the first reflecting surface 42. In other words, the second optical axis of the first transmission surface 51 coincides with the optical axis M of the first optical element 33. The first transmission surface 51 is provided with a rotationally symmetric shape centering on the second optical axis. The first transmission surface 51 has positive power. The first transmission surface 51 is provided with an aspherical shape.

The second reflecting surface 52 is a plane mirror with no power. The second reflecting surface 52 is tilted 45° with respect to the Y axis and the Z axis. The second reflecting surface 52 folds the light path as much as 90° between the first transmission surface 51 and the second transmission surface 53. The second reflecting surface 52 is formed by disposing a reflective coating layer on the outer side surface at the Z1 direction side of the second optical element 34.

The second transmission surface 53 faces to the Y2 direction, and is opposed to a lens L15. An angle formed between the optical axis of the second transmission surface 53 and the second optical axis of the first transmission surface 51 is 90°. In other words, an angle formed between the optical axis of the second transmission surface 53 and the optical axis M of the first optical element 33 is 90°. Further, the optical axis of the second transmission surface 53 coincides with the optical axis N of the second optical system 32. The second transmission surface 53 is provided with a rotationally symmetric shape centering on the optical axis of the second transmission surface 53. The second transmission surface 53 has positive power. The second transmission surface 53 is provided with an aspherical shape.

As show in FIG. 11, the second optical system 32 is provided with 12 lenses L1 through L12. The lens L1 through the lens L12 are arranged in this order from the reduction side toward the enlargement side. The lens L2, the lens L7, and the lens L12 are each an aspherical lens provided with aspherical shapes on the both surfaces. Each of the lenses in the first optical system 31 is provided with a rotationally symmetric surface centering on the optical axis N.

Here, as shown in FIG. 11, the liquid crystal panel 18 arranged on the reduction-side conjugated plane of the optical system 3C forms the projection image at the Z2 direction side of the optical axis N. Further, an angle θ1 formed between the optical axis M of the first optical element 33 and the optical axis N of the second optical system 32 is no larger than 90°. In the present example, the angle θ1 formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 42 of the first optical element 33 toward the Z1 direction and the Y1 direction, and then reaches the screen S.

Further, as shown in FIG. 11, the optical system 3C forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 42 of the first optical element 33 and the second transmission surface 53 of the second optical element 34.

Here, as shown in FIG. 12, the light proceeding between the third transmission surface 41 and the first reflecting surface 42 is provided with peripheral light L tilted in a direction of getting away from the screen S as the enlargement-side conjugated plane as coming closer to the third transmission surface 41. The peripheral light L is tilted in a direction of coming closer to the screen S as getting away from the third transmission surface 41 between the third transmission surface 41 and the screen S. Further, an imaginary line Q connecting a maximal effective point P of the peripheral light L on the third transmission surface 41 and the center of curvature of the third transmission surface 41 crosses the optical axis M (the third optical axis) at an angle θ2 no smaller than 90°.

Lens data of the optical system 3C are as follows. Surface numbers are attached in sequence from the reduction side toward the enlargement side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFERENCE SYMBOL | SURFACE NUMBER | R | D | nd | vd | MODE | Y |
|---|---|---|---|---|---|---|---|
| 18 | 0 | 0.00000 | 22.000000 | | | REFRACTION | |
| 19 | 1 | 0.00000 | 37.300000 | −1.516800 | 64.17 | REFRACTION | 18.4130 |
| | 2 | 0.00000 | 0.409841 | | | REFRACTION | 22.0000 |
| L1 | 3 | −590.67796 | 10.000000 | 1.601496 | 58.49 | REFRACTION | 22.0000 |
| | 4 | −42.72242 | 3.000000 | | | REFRACTION | 22.4270 |
| L2 | *5 | −31.66863 | 2.000000 | 2.001100 | 28.26 | REFRACTION | 21.9910 |
| | *6 | −61.15100 | 0.500000 | | | REFRACTION | 23.5070 |
| L3 | 7 | 144.21520 | 2.000000 | 2.001000 | 29.13 | REFRACTION | 25.6220 |
| | 8 | 122.54476 | 0.500000 | | | REFRACTION | 25.8240 |
| L4 | 9 | 90.65158 | 7.654132 | 1.505040 | 72.69 | REFRACTION | 26.5750 |
| | 10 | 654.66116 | 0.500000 | | | REFRACTION | 27.2070 |
| L5 | 11 | 112.00335 | 2.000000 | 1.879323 | 36.94 | REFRACTION | 28.0900 |
| | 12 | 76.00335 | 1.535871 | | | REFRACTION | 28.1060 |
| L6 | 13 | 92.61405 | 20.000000 | 1.480772 | 78.39 | REFRACTION | 28.3600 |
| | 14 | −46.55932 | 80.000000 | | | REFRACTION | 29.1400 |
| O | 15 | 0.00000 | 78.806011 | | | REFRACTION | 17.0000 |
| L7 | *16 | 94.28008 | 7.570544 | 1.509398 | 56.47 | REFRACTION | 40.0000 |
| | *17 | 94.93422 | 71.132325 | | | REFRACTION | 34.5630 |
| L8 | 18 | −1518.99365 | 19.999983 | 2.002500 | 19.32 | REFRACTION | 43.9240 |
| | 19 | −155.81886 | 17.456943 | | | REFRACTION | 45.2540 |
| L9 | 20 | 71.47955 | 30.000000 | −1.529865 | 45.90 | REFRACTION | 40.9460 |
| | 21 | −121.50056 | 1.883188 | | | REFRACTION | 37.5510 |
| L10 | 22 | −101.70642 | 2.000000 | 2.002700 | 19.32 | REFRACTION | 36.5880 |
| | 23 | 82.52373 | 31.678777 | | | REFRACTION | 34.9860 |
| L11 | 24 | −105.69324 | 4.989296 | 1.437001 | 95.10 | REFRACTION | 39.9880 |
| | 25 | −89.28078 | 17.118289 | | | REFRACTION | 40.9730 |
| L12 | *26 | −23.55002 | 8.000000 | 1.509398 | 56.47 | REFRACTION | 48.0000 |
| | *27 | −165.55002 | 43.658778 | | | REFRACTION | 47.5050 |
| 34 | *28 | −100.00000 | 72.000000 | 1.509398 | 56.47 | REFRACTION | 57.2550 |
| | 29 | 0.00000 | −15.000000 | 1.509398 | 56.47 | REFLECTION | 81.6940 |
| | *30 | 2014.46301 | −3.472339 | | | REFRACTION | 63.3480 |
| 33 | *31 | −138.80012 | −64.000000 | 1.509398 | 56.47 | REFRACTION | 62.0000 |
| | *32 | 33.36242 | 0.000000 | 1.509398 | 56.47 | REFLECTION | 69.4220 |
| | 33 | −80.00000 | 0.000000 | | | REFRACTION | 41.5690 |
| | 34 | 0.00000 | 0.000000 | | | REFRACTION | 1773.6130 |
| S | 35 | 0.00000 | 0.000000 | | | REFRACTION | 1773.6130 |

Aspheric coefficients are as follows.

| SURFACE NUMBER | 5 | 6 | 16 | 17 | 26 |
|---|---|---|---|---|---|
| CONIC CONSTANT | −1E+00 | −1E+00 | −1E+00 | −1E+00 | −1.133807E+00 |
| 4-TH-ORDER COEFFICIENT | 3.694405E−06 | 7.654845E−06 | 2.143317E−06 | 2.748365E−06 | 4.559836E−06 |
| 6-TH-ORDER COEFFICIENT | −8.028217E−09 | −6.949011E−09 | 1.366512E−09 | 1.549676E−09 | −3.539447E−09 |
| 8-TH-ORDER COEFFICIENT | 6.506012E−12 | 8.188262E−12 | −1.450751E−13 | 1.723083E−13 | 1.671317E−12 |
| 10-TH-ORDER COEFFICIENT | −1.527956E−15 | −2.860017E−15 | 1.382604E−16 | 1.058483E−16 | −2.300276E−16 |

| SURFACE NUMBER | 27 | 28 | 30 | 31 | 32 |
|---|---|---|---|---|---|
| CONIC CONSTANT | −5.958633E+01 | −1.074643E+01 | −1.115037E+43 | −4.86632E+01 | −1.098222E+00 |
| 4-TH-ORDER COEFFICIENT | −4.700304E−06 | 2.368596E−06 | −2.160545E−06 | −2.274983E−06 | −1.57618E−06 |
| 6-TH-ORDER COEFFICIENT | 1.031617E−09 | −7.978636E−10 | 1.808458E−09 | 7.397958E−10 | 1.305372E−10 |

-continued

| | | | | | |
|---|---|---|---|---|---|
| 8-TH-ORDER COEFFICIENT | −2.69451E−13 | 1.397035E−13 | −3.726332E−13 | 8.793892E−15 | 2.869818E−14 |
| 10-TH-ORDER COEFFICIENT | 5.580673E−17 | −9.252121E−18 | 2.502569E−17 | −1.526278E−18 | −3.836358E−18 |

Ray coordinates on an object surface are as follows.

| RAY NUMBER | X COORDINATE | Y COORDINATE |
|---|---|---|
| 1 | 0 | −1.38 |
| 2 | 0 | −4.83 |
| 3 | 0 | −8.28 |
| 4 | 0 | −11.73 |
| 5 | 0 | −15.18 |

Further, in the present example, the surface numbers 29, 33, and 34 are each an eccentric surface. Parameters of the eccentric surfaces are as follows.

| SURFACE NUMBER 29 | |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 45.0000 |

| SURFACE NUMBER 33 | |
|---|---|
| TYPE OF ECCENTRICITY | GLOBAL COORDINATE |
| GLOBAL REFERENCE SURFACE | 32 |
| PARAMETER X | 0.0000 |
| PARAMETER Y | −80.0000 |
| PARAMETER Z | 44.6790 |
| PARAMETER α | −90.0000 |

| SURFACE NUMBER 34 | |
|---|---|
| TYPE OF ECCENTRICITY | GLOBAL COORDINATE |
| GLOBAL REFERENCE SURFACE | 32 |
| PARAMETER X | 0.0000 |
| PARAMETER Y | 0.0000 |
| PARAMETER Z | 201.0000 |
| PARAMETER α | 0.0000 |

Functions and Advantages

The optical system 3C according to the present example is capable of obtaining substantially the same functions and advantages as those of the optical system 3A according to Practical Example 1. Further, in the present example, the first optical element 33 has a third transmission surface 41 located at an enlargement side of the first reflecting surface 42, and a fourth transmission surface 43 located at a reduction side of the first reflecting surface 42. Therefore, the light emitted from the first transmission surface 51 of the second optical element 34 reaches the screen S via the fourth transmission surface 43 of the first optical element 33, the first reflecting surface 42, and the third transmission surface 41 in this order. Thus, since it is possible to control the projection light before the projection light enters the first reflecting surface 42, it is possible to suppress a field curvature aberration of the intermediate image 30 formed at the reduction side of the first reflecting surface 42. Further, since it is possible to correct the field curvature aberration in the intermediate image 30, it is possible to reduce the burden on the optical system at the reduction side for canceling out an amount of the curvature. Thus, it becomes possible to reduce the whole of the optical system in size.

In the present example, the third transmission surface 41 is provided with a convex shape rotationally symmetric centering on the third optical axis thereof. Further, in the optical system 3C according to the present example, the light passing between the third transmission surface 41 and the first reflecting surface 42 is provided with the peripheral light L tilted in a direction of getting away from the screen S as the enlargement-side conjugated plane as coming closer to the third transmission surface 41. Further, when defining the imaginary line Q connecting a maximal effective point P of the peripheral light L on the third transmission surface 41 and the center of curvature of the third transmission surface 41, the imaginary line Q crosses the third optical axis at an angle θ2 no smaller than 90°. Therefore, when the light having entered the first optical element 33 from the fourth transmission surface 43 at the reduction side is folded by the first reflecting surface 42 and then proceeds toward the third transmission surface 41, the peripheral light L of that light proceeds toward the direction of getting away from the screen S, and at the same time, reaches an area not directly opposed to the screen S on the third transmission surface 41. Here, when that peripheral light L fails to reach the screen S, there occurs a problem that the periphery of an enlarged image projected on the screen S becomes dark. In contrast, in the present example, the third transmission surface 41 has power. Thus, the peripheral light L is tilted in a direction of coming closer to the screen S as getting away from the third transmission surface 41 between the third transmission surface 41 and the screen S. In other words, the peripheral light L which is folded by the first reflecting surface 42, and then proceeds toward the direction of getting away from the screen S in the first optical element 33 proceeds toward the screen S via the third transmission surface 41. Therefore, it is possible to ensure an amount of light on the periphery of the enlarged image to be projected on the screen S.

In the present example, the third optical axis of the third transmission surface 41 and the fourth optical axis of the fourth transmission surface coincide with the first optical axis. By adopting such a configuration, it becomes easy to manufacture the first optical element 33.

In the present example, the first reflecting surface 42 and the fourth transmission surface 43 are each provided with an aspherical shape. Therefore, it is easier to correct a variety of aberrations.

Figure 13:
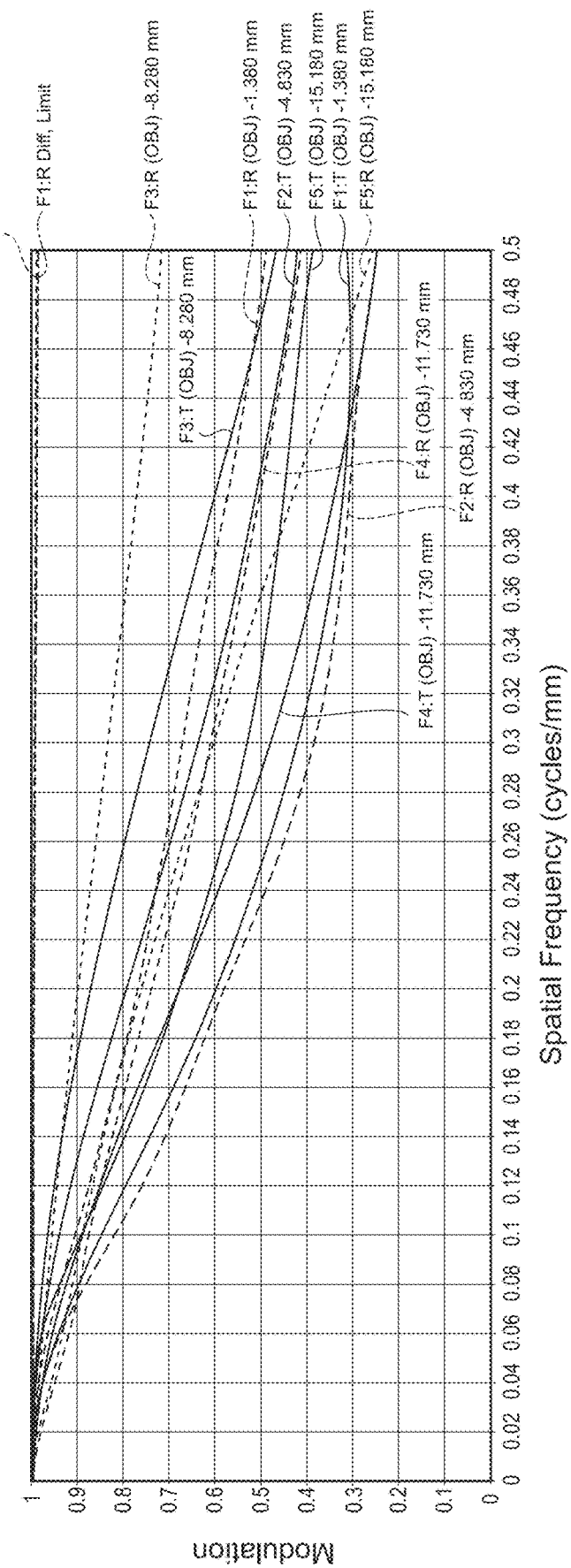
FIG. 13 is a diagram showing an MTF at an enlargement side of the optical system according to Practical Example 3.

FIG. 13 is a diagram showing an MTF at the enlargement side of the optical system 3C. In FIG. 13, the horizontal axis represents a spatial frequency, and the vertical axis represents a contrast reproduction rate. As shown in FIG. 13, the optical system 3C according to the present example is high in resolution.

Figure 14:
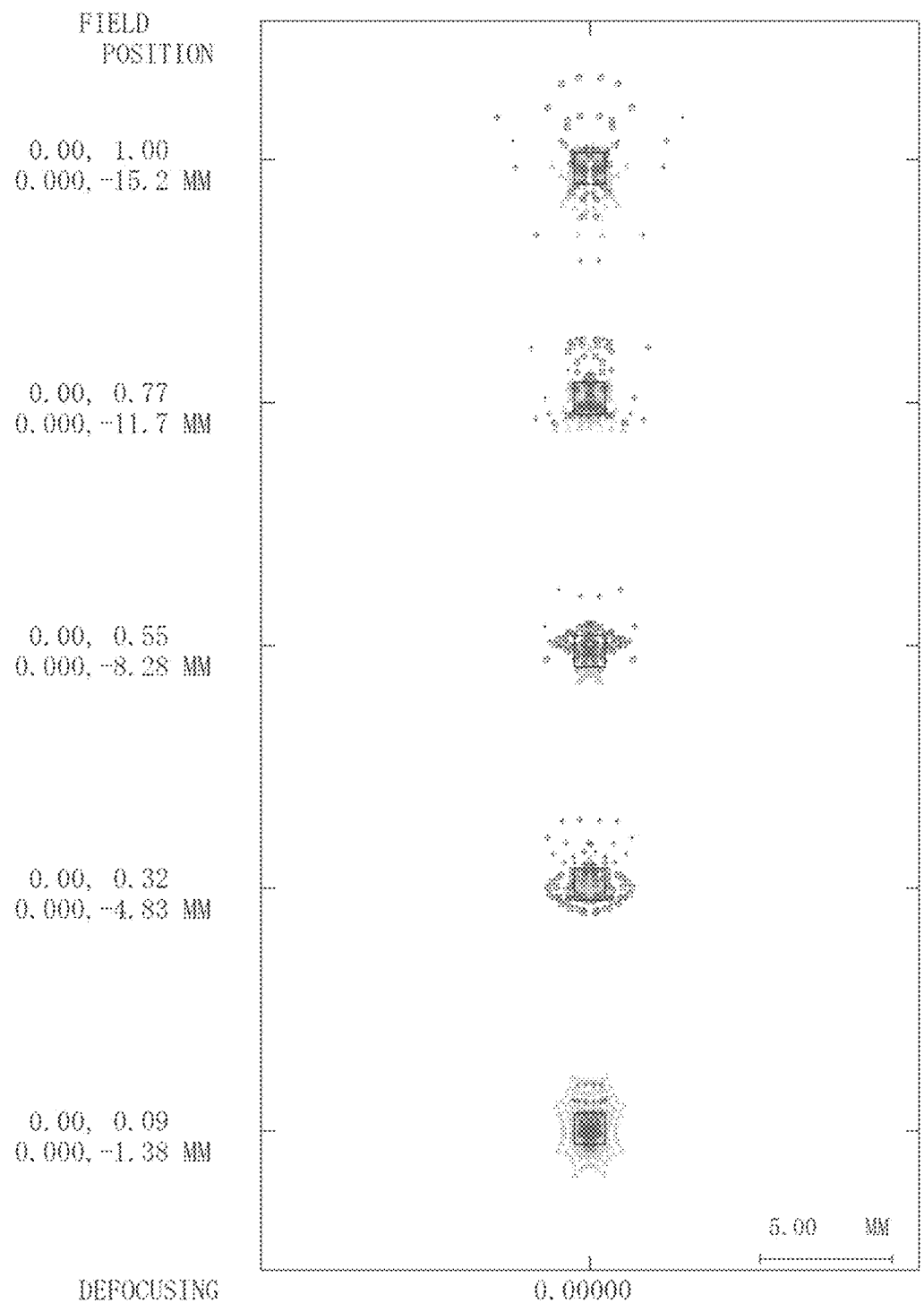
FIG. 14 is a spot diagram of the optical system according to Practical Example 3.

FIG. 14 is a spot diagram of the optical system 3C. As shown in FIG. 14, in the present example, a variation in spot is suppressed.

Practical Example 4

Figure 15:
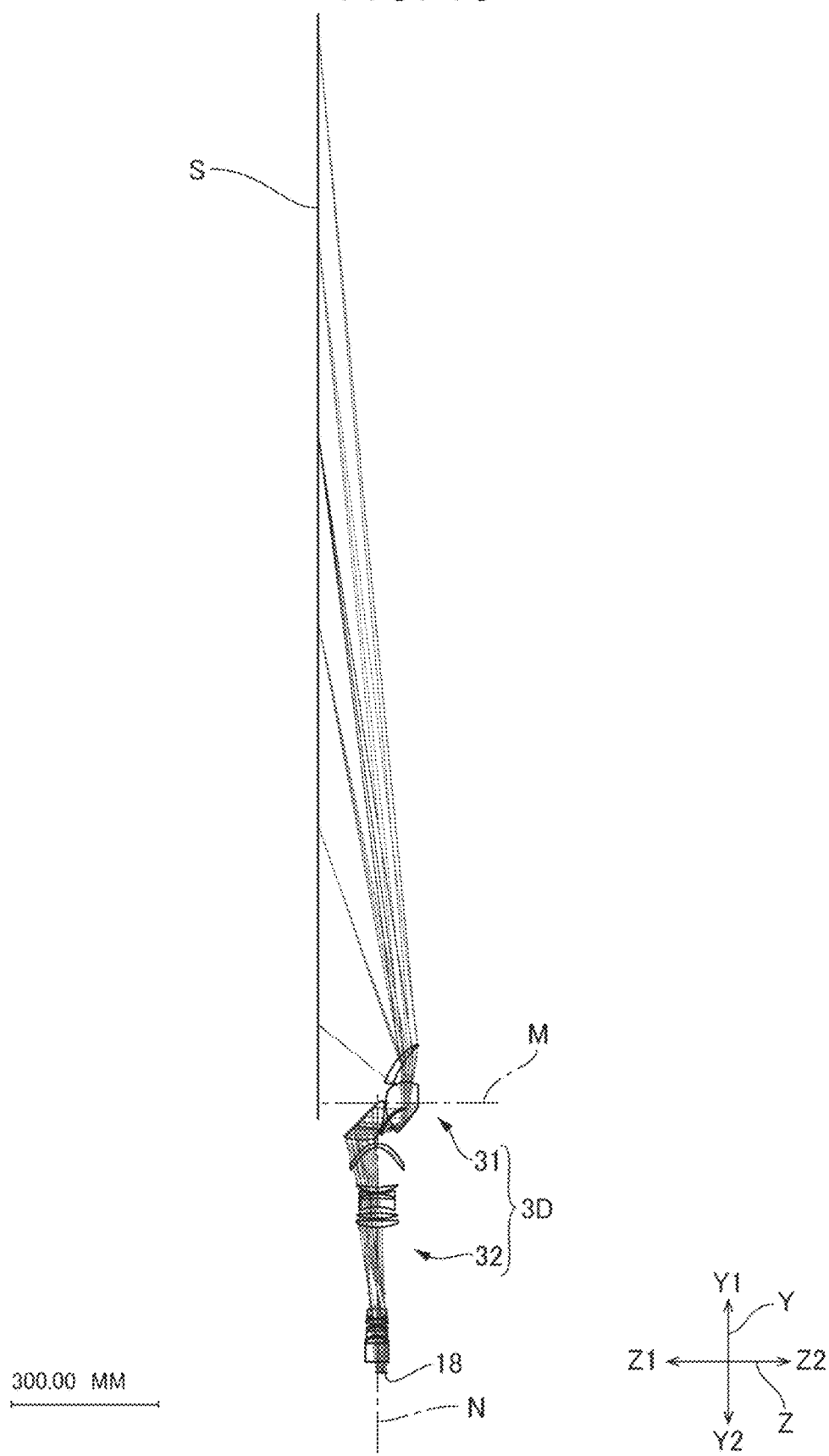
FIG. 15 is a ray chart schematically showing a whole of an optical system according to Practical Example 4.
Figure 16:
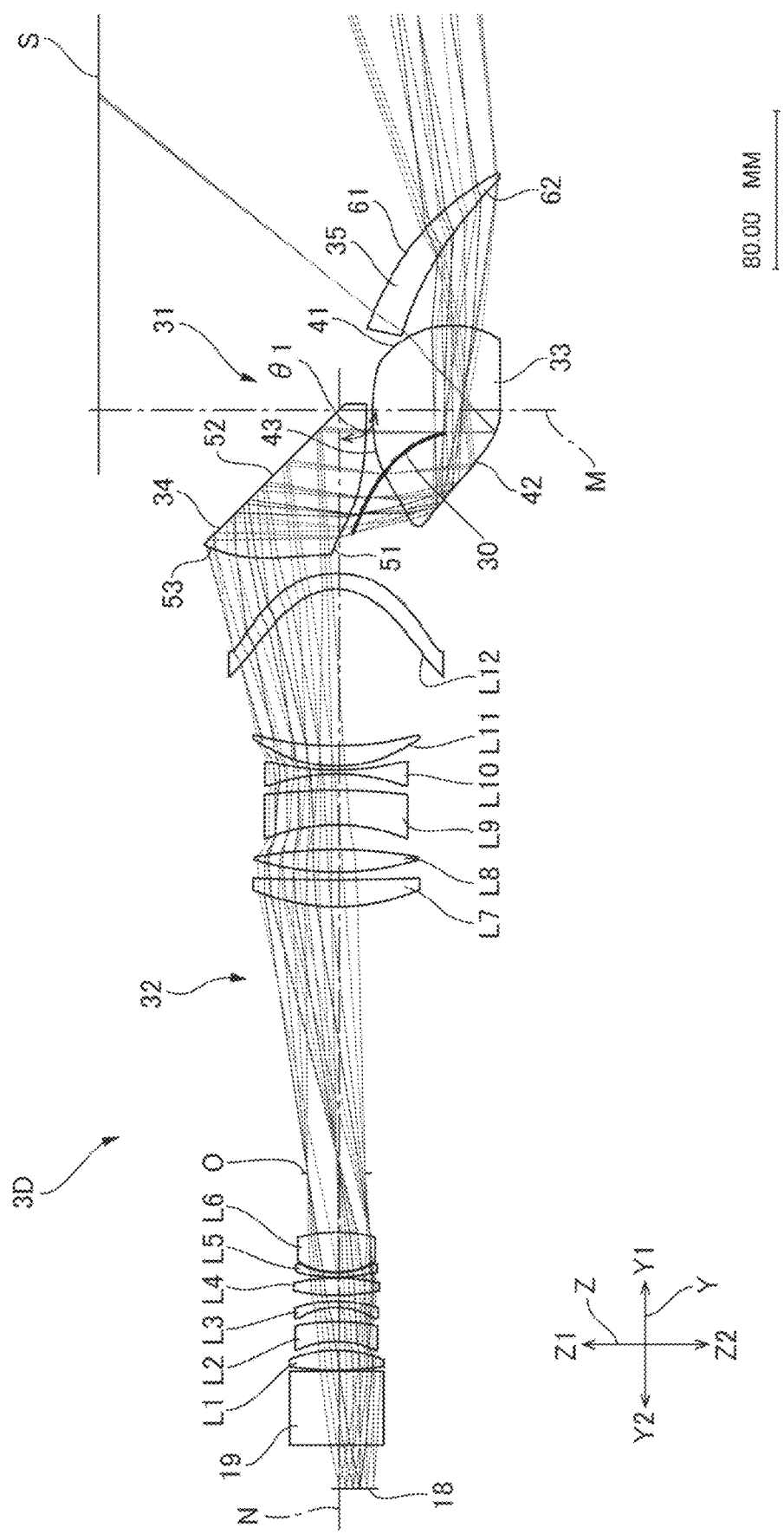
FIG. 16 is a ray chart of the optical system according to Practical Example 4.
Figure 17:
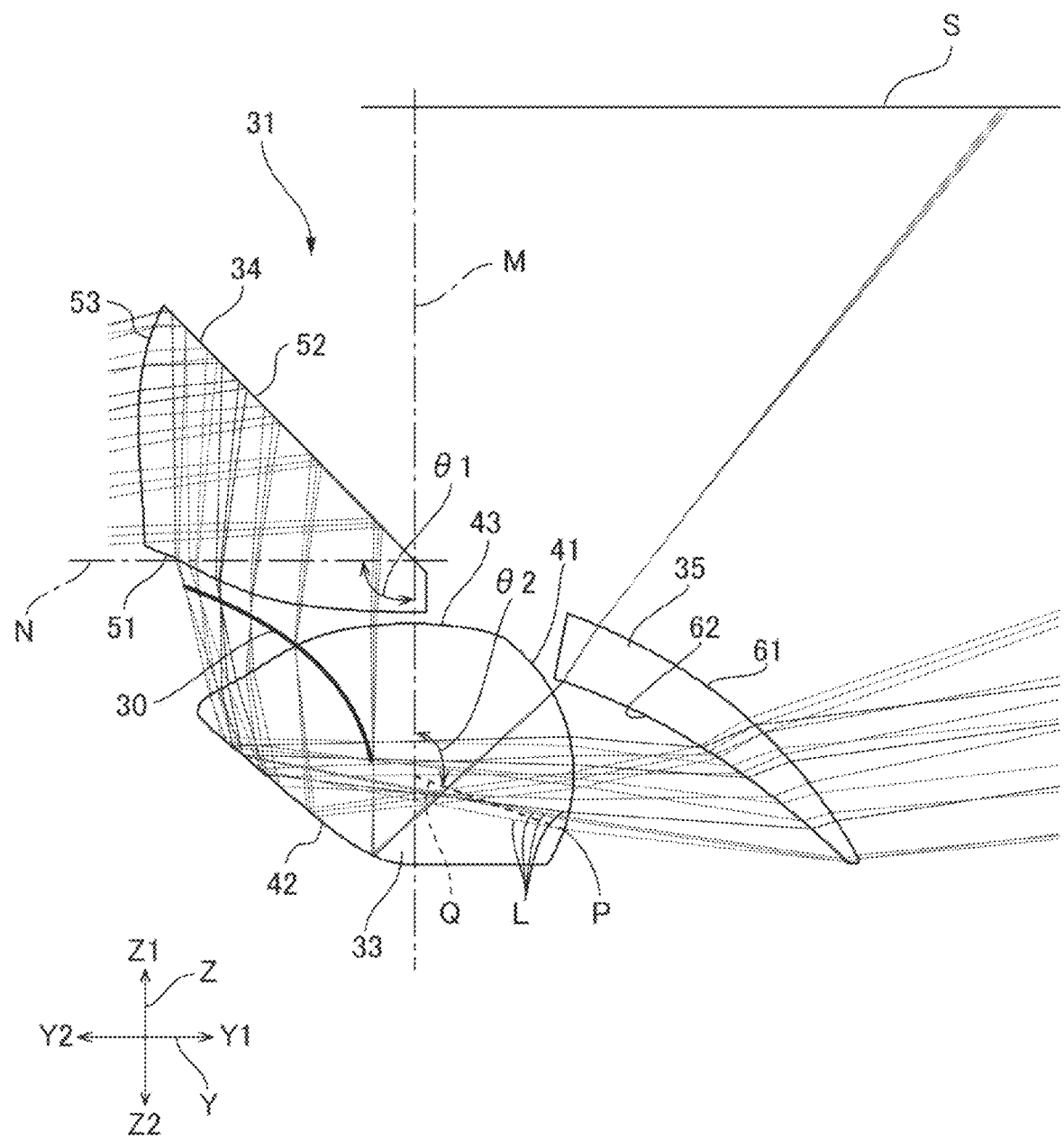
FIG. 17 is a ray chart of a first optical system in Practical Example 4.

FIG. 15 is a ray chart schematically showing a whole of an optical system according to Practical Example 4. FIG. 16 is a ray chart of the optical device 3D according to Practical Example 4. FIG. 17 is a ray chart of a first optical system in Practical Example 4. As shown in FIG. 15 and FIG. 16, on a reduction-side conjugated plane of the optical system 3D, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 15, the optical system 3D according to the present example has a first optical system 31 and a second optical system 32 disposed in sequence from an enlargement side toward a reduction side. The first optical system 31 is a reflective optical system. The first optical system 31 is provided with a correction lens 35, a first optical element 33, and a second optical element 34. The correction lens 35, the first optical element 33, and the second optical element 34 are arranged in this order from the enlargement side toward the reduction side. An optical axis M of the first optical element 33 extends along the Z-axis direction. In other words, the optical axis M of the first optical element 33 is perpendicular to the screen S. The second optical system 32 is a refracting optical system. An optical axis N (a sixth optical axis) of the second optical system 32 extends along the Y-axis direction. The screen S is located at the Z1 direction side of the optical axis N.

The correction lens 35 is located at the Y1 direction side of the first optical element 33. A fifth optical axis of the correction lens 35 coincides with the optical axis M of the first optical system 31. The correction lens 35 has positive power. The correction lens 35 is provided with a first lens surface 61 facing to the enlargement side, and a second lens surface 62 facing to the reduction side. The first lens surface 61 is provided with a convex shape. The first lens surface 61 is provided with an aspherical shape. The second lens surface 62 is provided with a concave shape. The second lens surface 62 is provided with an aspherical shape. The first lens surface 61 and the second lens surface 62 are each provided with a rotationally symmetric shape centering on the fifth optical axis of the correcting lens 35.

As shown in FIG. 16, the first optical element 33 is formed of a single optical element. The first optical element 33 is located at the Z2 direction side of the second optical element 34. The first optical element 33 has a third transmission surface 41, a first reflecting surface 42 located at a reduction side of the third transmission surface 41, and a fourth transmission surface 43 located at a reduction side of the first reflecting surface 42.

The third transmission surface 41 is provided with a convex shape facing to the Y1 direction. A third optical axis of the third transmission surface 41 coincides with the optical axis M of the first optical system 31. The third transmission surface 41 is provided with a rotationally symmetric shape centering on the third optical axis of the third transmission surface 41. The third transmission surface 41 has positive power.

The first reflecting surface 42 is located at the Y2 direction side of the third transmission surface 41. The first reflecting surface 42 is provided with a concave shape concaved toward the Z2 direction. A first optical axis of the first reflecting surface 42 coincides with the optical axis M of the first optical system 31. The first reflecting surface 42 is provided with a rotationally symmetric shape centering on the first optical axis of the first reflecting surface 42. The first reflecting surface 42 has positive power. The first reflecting surface 42 is provided with an aspherical shape. The first reflecting surface 42 is formed by disposing a reflective coating layer on the outer side surface at the Z2 direction side of the first optical element 33.

A fourth optical axis of the fourth transmission surface 43 coincides with the optical axis M of the first optical system 31. The fourth transmission surface 43 is provided with a rotationally symmetric shape centering on the fourth optical axis of the fourth transmission surface 43. The fourth transmission surface 43 has positive power. The fourth transmission surface 43 is provided with an aspherical shape.

Here, the first optical element 33 is designed using the optical axis M as a design axis. In other words, the third optical axis is a design optical axis of the third transmission surface 41. The first optical axis is a design optical axis of the first reflecting surface 42. The fourth optical axis is a design optical axis of the fourth transmission surface 43.

The second optical element 34 is formed of a single optical element. The second optical element 34 is located at the Z1 direction side of the first optical element 33. The second optical element 34 has a first transmission surface 51, a second reflecting surface 52 located at a reduction side of the first transmission surface 51, and a second transmission surface 53 located at a reduction side of the second reflecting surface 52.

The first transmission surface 51 is opposed in the Z-axis direction to the fourth transmission surface 43. The first transmission surface 51 is provided with a convex shape facing to the Z2 direction. A second optical axis of the first transmission surface 51 is substantially parallel to the first optical axis of the first reflecting surface 42. In the present example, the second optical axis of the first transmission surface 51 coincides with the first optical axis of the first reflecting surface 42. In other words, the second optical axis of the first transmission surface 51 coincides with the optical axis M of the first optical element 33. The first transmission surface 51 is provided with a rotationally symmetric shape centering on the second optical axis. The first transmission surface 51 has positive power. The first transmission surface 51 is provided with an aspherical shape.

The second reflecting surface 52 is a plane mirror with no power. The second reflecting surface 52 is tilted 45° with respect to the Y axis and the Z axis. The second reflecting surface 52 folds the light path as much as 90° between the first transmission surface 51 and the second transmission surface 53. The second reflecting surface 52 is formed by disposing a reflective coating layer on the outer side surface at the Z1 direction side of the second optical element 34.

The second transmission surface 53 faces to the Y2 direction, and is opposed to a lens L12. An angle formed between the optical axis of the second transmission surface 53 and the second optical axis of the first transmission surface 51 is 90°. In other words, an angle formed between the optical axis of the second transmission surface 53 and the optical axis M of the first optical element 33 is 90°. Further, the optical axis of the second transmission surface 53 coincides with the optical axis N of the second optical system 32. The second transmission surface 53 is provided with a rotationally symmetric shape centering on the optical axis of the second transmission surface 53. The second transmission surface 53 has positive power. The second transmission surface 53 is provided with an aspherical shape.

As show in FIG. 16, the second optical system 32 is provided with 12 lenses L1 through L12. The lens L1 through the lens L12 are arranged in this order from the reduction side toward the enlargement side. The lens L2, the lens L7, and the lens L12 are each an aspherical lens provided with aspherical shapes on the both surfaces. Each of the lenses in the first optical system 31 is provided with a rotationally symmetric surface centering on the optical axis N.

Here, as shown in FIG. 16, the liquid crystal panel 18 arranged on the reduction-side conjugated plane of the optical system 3D forms the projection image at the Z2 direction side of the optical axis N. Further, an angle θ1 formed between the optical axis M of the first optical element 33 and the optical axis N of the second optical system 32 is no larger than 90°. In the present example, the angle θ1 formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 42 of the first optical element 33 toward the Z1 direction and the Y1 direction, and then reaches the screen S.

Further, as shown in FIG. 16, the optical system 3D forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 42 of the first optical element 33 and the second transmission surface 53 of the second optical element 34.

Here, as shown in FIG. 17, the light proceeding between the third transmission surface 41 and the first reflecting surface 42 is provided with peripheral light L tilted in a direction of getting away from the screen S as the enlargement-side conjugated plane as coming closer to the third transmission surface 41. The peripheral light L is tilted in a direction of getting away from the screen S as getting away from the third transmission surface 41 between the third transmission surface 41 and the correction lens 35. Further, the peripheral light L is tilted in a direction of coming closer to the screen S as getting away from the correction lens 35 between the correction lens 35 and the screen S. Further, an imaginary line Q connecting a maximal effective point P of the peripheral light L on the third transmission surface 41 and the center of curvature of the third transmission surface 41 crosses the optical axis M (the third optical axis) at an angle θ2 no smaller than 90°.

Lens data of the optical system 3D are as follows. Surface numbers are attached in sequence from the reduction side toward the enlargement side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFERENCE SYMBOL | SURFACE NUMBER | R | D | nd | vd | MODE | Y |
|---|---|---|---|---|---|---|---|
| 18 | 0 | 0.00000 | 22.000000 | | | REFRACTION | |
| 19 | 1 | 0.00000 | 37.300000 | 1.516800 | 64.17 | REFRACTION | 20.3480 |
| | 2 | 0.00000 | 0.762700 | | | REFRACTION | 22.1060 |
| L1 | 3 | 157.73710 | 10.000000 | 1.994904 | 27.96 | REFRACTION | 22.2740 |
| | 4 | −59.76320 | 4.440906 | | | REFRACTION | 22.1250 |
| L2 | 5 | −47.37529 | 0.000000 | 2.050800 | 26.94 | REFRACTION | 19.2330 |
| | 6 | −103.89113 | 7.276867 | | | REFRACTION | 19.2740 |
| L3 | 7 | −35.49424 | 3.259752 | 1.937229 | 32.32 | REFRACTION | 18.4950 |
| | 8 | −63.50302 | 3.002572 | | | REFRACTION | 19.5370 |
| L4 | 9 | 103.13388 | 8.732663 | 1.658725 | 41.40 | REFRACTION | 20.1430 |
| | 10 | −94.40586 | 0.500000 | | | REFRACTION | 19.9850 |
| L5 | 11 | 89.94729 | 2.000000 | 2.050800 | 26.94 | REFRACTION | 19.0060 |
| | 12 | 37.49030 | 0.500000 | | | REFRACTION | 18.0290 |
| L6 | 13 | 36.863632 | 0.000000 | 1.446156 | 80.88 | REFRACTION | 18.1140 |
| | 14 | −69.65825 | 0.000000 | | | REFRACTION | 17.0000 |
| O | 15 | 0.00000 | 134.972004 | | | REFRACTION | 14.4000 |
| L7 | 16 | 105.41092 | 13.783413 | 1.469124 | 82.22 | REFRACTION | 40.0000 |
| | 17 | 1094.72746 | 3.834971 | | | REFRACTION | 39.0280 |
| L8 | 18 | 137.23940 | 1.351333 | 1.986125 | 16.48 | REFRACTION | 39.2540 |
| | 19 | −228.96975 | 12.674715 | | | REFRACTION | 38.9460 |
| L9 | 20 | −90.50307 | 17.528035 | 1.869148 | 18.09 | REFRACTION | 34.1820 |
| | 21 | −301.24837 | 8.314561 | | | REFRACTION | 33.5580 |
| L10 | 22 | −97.26184 | 2.000000 | 1.986125 | 16.48 | REFRACTION | 32.8700 |
| | 23 | 137.98515 | 2.000000 | | | REFRACTION | 34.1190 |
| L11 | 24 | 70.50560 | 10.000000 | 1.455365 | 87.06 | REFRACTION | 39.7670 |
| | 25 | 157.41492 | 79.583464 | | | REFRACTION | 39.9520 |
| L12 | 26 | −27.57550 | 8.000000 | 1.509186 | 56.32 | REFRACTION | 48.0000 |
| | *27 | −47.11522 | 9.521845 | | | REFRACTION | 51.6580 |
| 34 | *28 | −140.46983 | 72.000000 | 1.509186 | 56.32 | REFRACTION | 64.8350 |
| | 29 | 0.00000 | −15.000000 | 1.509186 | 56.32 | REFLECTION | 91.6220 |
| | *30 | 230.59254 | −3.000000 | | | REFRACTION | 63.7000 |

-continued

| REFER-ENCE SYMBOL | SURFACE NUMBER | R | D | nd | vd | MODE | Y |
|---|---|---|---|---|---|---|---|
| 33 | *31 | −54.82491 | −64.000000 | 1.509186 | 56.32 | REFRACTION | 54.3140 |
|  | *32 | 20.67261 | 0.000000 | 1.509186 | 56.32 | REFLECTION | 51.1060 |
|  | 33 | −44.00000 | 0.000000 |  |  | REFRACTION | 21.6820 |
| 35 | *34 | −131.10106 | 20.000000 | 1.509186 | 56.32 | REFRACTION | 117.8940 |
|  | *35 | −100.00000 | 0.000000 |  |  | REFRACTION | 120.9940 |
|  | 36 | 0.00000 | 0.000000 |  |  | REFRACTION | 2186.7700 |
| S | 37 | 0.00000 | 0.000000 |  |  | REFRACTION | 2186.7700 |

Aspheric coefficients are as follows.

| SURFACE NUMBER | 26 | 27 | 28 | 30 |
|---|---|---|---|---|
| CONIC CONSTANT | −7.983351E−01 | −7.935454E−01 | −5.694192E+01 | 7.416526E−01 |
| 4-TH-ORDER COEFFICIENT | 1.571127E−06 | −2.932391E−06 | 8.694656E−07 | −5.656628E−07 |
| 6-TH-ORDER COEFFICIENT | −5.227067E−10 | 7.948796E−10 | −1.45704E−10 | 7.550079E−10 |
| 8-TH-ORDER COEFFICIENT | 4.752561E−13 | −2.731021E−13 | 3.119986E−14 | −2.009279E−13 |
| 10-TH-ORDER COEFFICIENT | −3.805627E−17 | 7.607665E−17 | −2.61777E−18 | 1.677154E−17 |

| SURFACE NUMBER | 31 | 32 | 34 | 35 |
|---|---|---|---|---|
| CONIC CONSTANT | −1.386817E+02 | −1.637304E+00 | −4.949426E−01 | −4.448864E−01 |
| 4-TH-ORDER COEFFICIENT | −4.815839E−06 | −1.617638E−06 | 2.724492E−08 | 3.262084E−07 |
| 6-TH-ORDER COEFFICIENT | 5.544913E−10 | 2.867275E−10 | −1.631719E−12 | −2.720302E−11 |
| 8-TH-ORDER COEFFICIENT | 5.021641E−13 | 5.726965E−14 | 2.587226E−16 | 1.045415E−15 |
| 10-TH-ORDER COEFFICIENT | −1.123307E−16 | −2.044994E−17 | −9.382203E−21 | −5.756513E−21 |

Ray coordinates on an object surface are as follows.

| RAY NUMBER | X COORDINATE | Y COORDINATE |
|---|---|---|
| 1 | 0 | −1.38 |
| 2 | 0 | −4.86 |
| 3 | 0 | −8.34 |
| 4 | 0 | −11.81 |
| 5 | 0 | −15.29 |
| 6 | 0 | −18.77 |

Further, in the present example, the surface numbers 29, 33, 34, and 36 are each an eccentric surface. Parameters of the eccentric surfaces are as follows.

| SURFACE NUMBER 29 | |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 45.0000 |

| SURFACE NUMBER 33 | |
|---|---|
| TYPE OF ECCENTRICITY | GLOBAL COORDINATE |
| GLOBAL REFERENCE SURFACE | 32 |
| PARAMETER X | 0.0000 |
| PARAMETER Y | −44.0000 |
| PARAMETER Z | 24.0000 |
| PARAMETER α | −90.0000 |

| SURFACE NUMBER 34 | |
|---|---|
| TYPE OF ECCENTRICITY | GLOBAL COORDINATE |
| GLOBAL REFERENCE SURFACE | 32 |
| PARAMETER X | 0.0000 |
| PARAMETER Y | 0.0000 |
| PARAMETER Z | 55.0000 |
| PARAMETER α | 0.0000 |

| SURFACE NUMBER 36 | |
|---|---|
| TYPE OF ECCENTRICITY | GLOBAL COORDINATE |
| GLOBAL REFERENCE SURFACE | 32 |
| PARAMETER X | 0.0000 |

| -continued | |
|---|---|
| PARAMETER Y | 0.0000 |
| PARAMETER Z | 201.0000 |
| PARAMETER α | 0.0000 |

Functions and Advantages

The optical system 3D according to the present example is capable of obtaining substantially the same functions and advantages as those of the optical system 3C according to Practical Example 3. Further, the optical system 3D according to the present example is provided with the correction lens 35 arranged at the enlargement side of the first optical element 33, and can therefore control the projection light at a position close to the screen S. Therefore, it is possible to tilt the peripheral light L in a direction of coming closer to the screen S as getting away from the correction lens 35 using the third transmission surface 41 and the correction lens 35. In other words, it is possible to generate the lens power for refracting the peripheral light L toward the screen S using two constituents, namely the third transmission surface 41 and the correction lens 35. Thus, since it is possible to make the lens power of the third transmission surface 41 lower compared to that in Practical Example 3, it is easy to process the first optical element 33. Further, since it is possible to make the lens power of the third transmission surface 41 low, it is easier to correct a variety of aberrations in the enlarged image.

Further, in the present example, the fifth optical axis of the correction lens 35 coincides with the first optical axis of the first reflecting surface 42. In other words, the fifth optical axis of the correction lens 35 coincides with the optical axis M of the first optical element 33. Therefore, it is possible to accurately arrange the first optical element 33 and the correction lens 35.

Figure 18:
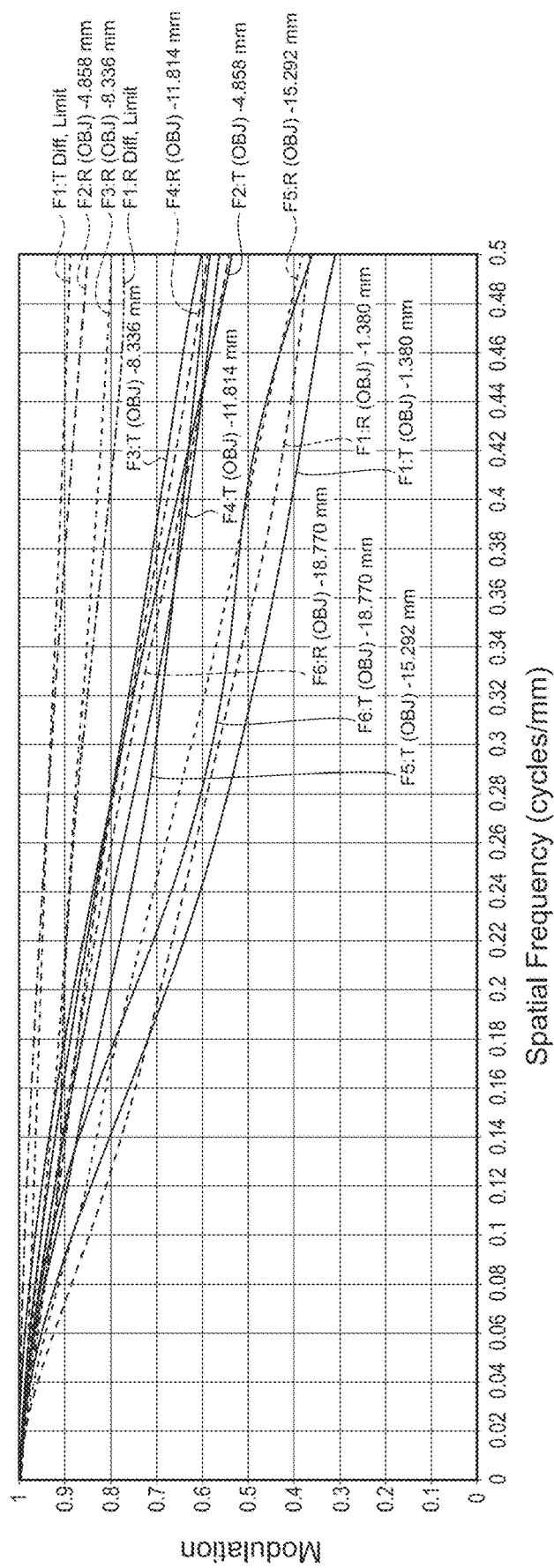
FIG. 18 is a diagram showing an MTF at an enlargement side of the optical system according to Practical Example 4.

FIG. 18 is a diagram showing an MTF at the enlargement side of the optical system 3D. In FIG. 18, the horizontal axis represents a spatial frequency, and the vertical axis represents a contrast reproduction rate. As shown in FIG. 18, the optical system 3D according to the present example is high in resolution.

Figure 19:
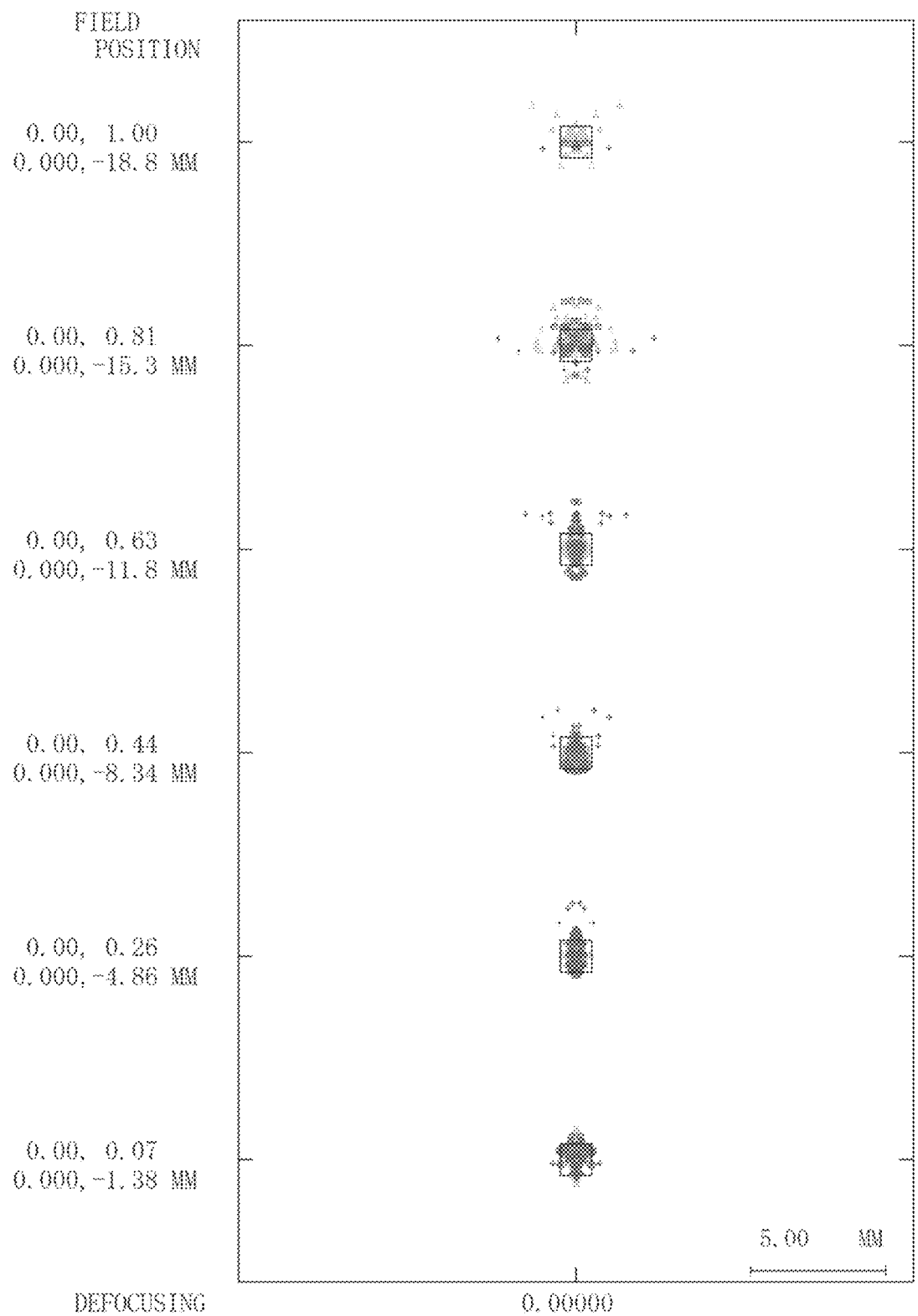
FIG. 19 is a spot diagram of the optical system according to Practical Example 4.

FIG. 19 is a spot diagram of the optical system 3D. As shown in FIG. 19, in the present example, a variation in spot is suppressed.

Other Embodiments

It should be noted that the optical system 3 in the present example can be used as an imaging lens. In this case, on the reduction-side imaging plane of the optical system 3, there is arranged an imaging element.

What is claimed is:

1. An optical system comprising:
a first optical element; and
a second optical element arranged at a reduction side of the first optical element, wherein
the first optical element has a first reflecting surface having a concave shape,
the second optical element has a first transmission surface, a second reflecting surface arranged at the reduction side of the first transmission surface, and a second transmission surface arranged at the reduction side of the second reflecting surface,
a first optical axis of the first reflecting surface is parallel to a second optical axis of the first transmission surface, and
at least one of the first transmission surface, the second reflecting surface, and the second transmission surface has power.

2. The optical system according to claim 1, wherein
an intermediate image conjugated with a reduction-side conjugated plane and an enlargement-side conjugated plane is formed between the first reflecting surface and the second transmission surface.

3. The optical system according to claim 1, wherein
the first optical element has a third transmission surface arranged at an enlargement side of the first reflecting surface, and a fourth transmission surface arranged at the reduction side of the first reflecting surface, and
the fourth transmission surface and the second transmission surface are opposed to each other.

4. The optical system according to claim 3, wherein
a third optical axis of the third transmission surface and a fourth optical axis of the fourth transmission surface coincide with the first optical axis.

5. The optical system according to claim 3, further comprising:
a correction lens arranged at the enlargement side of the first optical element.

6. The optical system according to claim 5, wherein
a fifth optical axis of the correction lens coincides with the first optical axis.

7. The optical system according to claim 4, wherein
the third transmission surface has a rotationally symmetric convex shape centering on the third optical axis,
light passing between the third transmission surface and the first reflecting surface includes peripheral light tilted in a direction of getting away from an enlargement-side conjugated plane as coming closer to the third transmission surface, and
an imaginary line connecting a maximal effective point of the peripheral light on the third transmission surface and a curvature center of the third transmission surface intersects the third optical axis at an angle no smaller than 90°.

8. The optical system according to claim 1, wherein
the second reflecting surface has a nonplanar shape.

9. The optical system according to claim 1, further comprising:
a refracting optical system arranged at the reduction side of the second optical element.

10. The optical system according to claim 9, wherein
the refracting optical system includes a plurality of lenses, and
the plurality of lenses has a rotationally symmetric shape centering on a sixth optical axis of the refracting optical system.

11. The optical system according to claim 10, wherein
an angle formed between the first optical axis and the sixth optical axis is no larger than 90°.

12. A projector comprising:
a light modulator arranged on a reduction-side conjugated plane and configured to modulate light emitted from a light source; and
the optical system according to claim 1 configured to project the light modulated by the light modulator.

* * * * *